United States Patent
Kim et al.

(10) Patent No.: US 9,059,813 B2
(45) Date of Patent: Jun. 16, 2015

(54) METHOD FOR TRANSMITTING UPLINK CONTROL INFORMATION AND USER EQUIPMENT, AND METHOD FOR RECEIVING UPLINK CONTROL INFORMATION AND BASE STATION

(75) Inventors: Kitae Kim, Anyang-si (KR); Jinyoung Chun, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 13/982,033

(22) PCT Filed: Nov. 30, 2011

(86) PCT No.: PCT/KR2011/009219
§ 371 (c)(1),
(2), (4) Date: Jul. 26, 2013

(87) PCT Pub. No.: WO2012/108616
PCT Pub. Date: Aug. 16, 2012

(65) Prior Publication Data
US 2013/0308503 A1 Nov. 21, 2013

Related U.S. Application Data

(60) Provisional application No. 61/442,275, filed on Feb. 13, 2011, provisional application No. 61/454,973, filed on Mar. 21, 2011.

(51) Int. Cl.
*H04Q 7/00* (2006.01)
*H04J 3/16* (2006.01)
*H04L 5/00* (2006.01)
*H04J 11/00* (2006.01)

(52) U.S. Cl.
CPC .......... *H04J 3/1694* (2013.01); *H04L 5/0053* (2013.01); *H04J 11/005* (2013.01); *H04L 5/0062* (2013.01)

(58) Field of Classification Search
None
See application file for complete search history.

(56) References Cited

U.S. PATENT DOCUMENTS

| 2008/0137562 A1 | 6/2008 | Li et al. | |
|---|---|---|---|
| 2008/0212543 A1* | 9/2008 | Ban | 370/336 |
| 2008/0304551 A1 | 12/2008 | Li et al. | |
| 2009/0046805 A1* | 2/2009 | Kim et al. | 375/295 |
| 2009/0116578 A1 | 5/2009 | Sperlich et al. | |
| 2009/0290549 A1* | 11/2009 | Tiirola et al. | 370/329 |
| 2010/0238888 A1* | 9/2010 | Sampath et al. | 370/329 |
| 2012/0329400 A1* | 12/2012 | Seo et al. | 455/63.1 |
| 2013/0033998 A1* | 2/2013 | Seo et al. | 370/252 |

* cited by examiner

*Primary Examiner* — Duc C Ho
(74) *Attorney, Agent, or Firm* — Birch, Stewart, Kolasch & Birch, LLP

(57) ABSTRACT

Disclosed are a method and a UE for transmitting uplink control information, and a method and a BS for receiving uplink control information. According to the present invention, a time-frequency resource for the UL transmission, which collides with the DL transmission by the neighbor cell, can be removed or reduced to mitigate inter-cell interference.

8 Claims, 21 Drawing Sheets

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

(c) 3 OFDM symbols (b) 2 OFDM symbols (a) 1 OFDM symbols

: PHICH

METHOD FOR TRANSMITTING UPLINK CONTROL INFORMATION AND USER EQUIPMENT, AND METHOD FOR RECEIVING UPLINK CONTROL INFORMATION AND BASE STATION

CROSS-REFERENCE TO RELATED APPLICATIONS

This application is the National Phase of PCT/KR2011/009219 filed on Nov. 30, 2011, which claims priority under 35 U.S.C. 119(e) to U.S. Provisional Application No. 61/442,275 filed on Feb. 13, 2011 and U.S. Provisional Application No. 61/454,973 filed on Mar. 21, 2011, all of which are hereby expressly incorporated by reference into the present application.

TECHNICAL FIELD

The present invention relates to a wireless communication system. More specifically, the invention relates to a method and an apparatus for transmitting uplink control information, and a method and an apparatus for receiving uplink control information.

BACKGROUND ART

Some physical layer (PHY) standards in wireless communication system defines a structures data sequence that has a fixed duration for communication between a user equipment and a base station. The structures data sequence is referred to as frame. One frame includes a specific number of time resource units. A time resource unit may be called a subframe or a slot. One subframe/slot may be configured so as to include a plurality of OFDM symbols in the time domain. For example, one subframe may be constructed of 2 slots, each including 7 OFDM symbols. The number of subframes per frame, the number of slots per subframe, and the number of OFDM symbols per slot are determined according to the physical standard of a corresponding system.

FIG. 1 schematically illustrates three duplex modes used for bidirectional wireless communication.

UL/DL configurations in a frame depend on a duplex mode. The duplex mode means bidirectional communication between two devices, distinguished from simplex which means one-way communication. In duplex communications, transmissions on links in both directions may occur simultaneously (full-duplex) or at mutually exclusive times (half-duplex).

A full-duplex transceiver is used to separate two communication links, which are in opposite directions from each other, in a frequency domain. In other words, different carrier frequencies are used for the respective links, which is referred to as frequency division duplex (FDD). On the contrary, a half-duplex transceiver is used to separate two communication links, which are in opposite directions from each other, in a time domain. A duplex mode in which the same carrier frequency is used for the respective links is referred to as time division duplex (TDD). The half-duplex transceiver may use different carrier frequencies for the two links, which is referred to as half-duplex FDD (HD-FDD). In the HD-FDD mode, communications in opposite directions for specific devices are performed at different instants of time as well as at different carrier frequencies. Accordingly, the HD-FDD mode can be considered as a hybrid of FDD and TDD.

FDD adopted by most communication standards is very efficient for systems having wide frequency bands since it has a paired spectrum. In addition, FDD can dynamically change DL/UL configurations. On the other hand, TDD segments the same frequency band by time to process both DL and UL. While TDD is advantageous to systems which mostly use traffic such as Voice over Internet Protocol (VoIP), it has disadvantages that a geographical area which can be covered by each communication device is smaller than that of FDD and a guard period is needed between a DL period and an UL period due to restrictions on Round Trip Time (RTT). However, TDD can use unpaired spectrum in case of insufficient frequency spectrum. FDD requires a transmitter and a receiver to include a duplexer, a filter, which is capable of separating UL and DL signals transmitted at different carrier frequencies from each other with high accuracy to transmit and receive signals simultaneously. The duplexer causes a certain degree of signal attenuation. This attenuation is generated in a low-noise amplifier on a signal path in the receiver, and thus it directly affects the noise level of the receiver to deteriorate the sensitivity of the receiver. In the case of the transmitter, the duplexer is located behind a power amplification stage on a signal path and requires a high-power amplifier for the power amplification stage in order to overcome or endure the signal attenuation. On the contrary, TDD does not require a transceiver to transmit and receive signals simultaneously, and thus the transceiver can be implemented without a duplexer, simplifying their circuit layouts.

However, a TDD system is allowed to use only one DL/UL frame configuration even though it defines a plurality of DL/UL frame configurations at the system level in order to maintain inter-cell interference between DLs and/or ULs uniform at the network level higher than the system level to reduce system complexity. In other words, while most TDD systems define various DL/UL frame configurations, each BS is restricted from freely configuring DL/UL frames. In 3GPP LTE system, for example, one network cannot have different DL/UL subframe configurations, and thus only one DL/UL subframe configuration is used on a network in which neighboring cells are organically linked to each other. A TDD system in which BSs have the same DL/UL subframe/frame configuration in the same network, as described above, is called a symmetric TDD system.

DISCLOSURE OF INVENTION

Technical Problem

The symmetric TDD system deteriorates flexibility of frame/subframe configuration, thus restricting efficient utilization of radio resources and preventing proper reflection of a data loading characteristic difference between BSs in the system. Therefore, recent communication standards have sought solution to support an asymmetric TDD system which permits BSs to use different DL/UL subframe configurations. In the asymmetric TDD system inter-cell interference is not uniform in the time domain, distinguished from the symmetric TDD system.

Therefore, a new scheme of relieving inter-cell interference in the asymmetric system is needed.

It is to be understood that objects to be achieved by the present invention are not limited to the aforementioned objects and other objects which are not mentioned will be apparent to those of ordinary skill in the art to which the present invention pertains from the following description.

Solution to Problem

To solve the above problems, a UE according to the present invention configures a channel for UL transmission by the UE in a specific format from among a plurality of channel formats or configures the channel for the UL transmission using only symbols other than a symbol assigned to DL transmission by a neighbor cell when the UL transmission and the DL transmission collide with each other in an asymmetric TDD communication system.

In accordance with one aspect of the present invention to achieve the objects, a method for transmitting uplink control information at a UE to a BS in a time resource unit including a plurality of orthogonal frequency division multiplexing (OFDM) symbols in a time division duplex (TDD) system includes: configuring an uplink control channel in the time resource unit; and transmitting the uplink control information in the time resource unit to the BS through the uplink control channel, wherein when the time resource unit includes an interfering OFDM symbol in which interference caused by a downlink control channel occurs, the configuring of the uplink control channel configures the uplink control channel using OFDM symbols other than the interfering OFDM symbol.

In accordance with another aspect of the present invention to achieve the objects, a method for receiving uplink control information at a BS from a UE in a time resource unit including a plurality of OFDM symbols in a TDD system includes: receiving the uplink control information from the UE through an uplink control channel allocated to the time resource unit; wherein when the time resource unit includes an interfering OFDM symbol in which interference caused by a downlink control channel occurs, the uplink control channel is configured using OFDM symbols other than the interfering OFDM symbol.

In accordance with another aspect of the present invention to achieve the objects, a UE for transmitting uplink control information to a BS in a time resource unit including a plurality of OFDM symbols in a TDD system includes: an RF unit configured to transmit/receive signals; and a processor connected to the RF unit and configured to control the RF unit, wherein the processor configures an uplink control channel in the time resource unit and controls the RF unit to transmit the uplink control information to the BS in the time resource unit through the uplink control channel, wherein when the time resource unit includes an interfering OFDM symbol in which interference caused by a downlink control channel occurs, the processor configures the uplink control channel using OFDM symbols other than the interfering OFDM symbol.

In accordance with another aspect of the present invention to achieve the objects, a BS for receiving uplink control information from a UE in a time resource unit including a plurality of OFDM symbols in a TDD system includes: an RF unit configured to transmit/receive signals; and a processor connected to the RF unit and configured to control the RF unit, wherein the processor controls the RF unit to receive the uplink control information from the UE through an uplink control channel allocated to the time resource unit, wherein when the time resource unit includes an interfering OFDM symbol in which interference caused by a downlink control channel occurs, the uplink control channel is configured using OFDM symbols other than the interfering OFDM symbol.

In accordance with another aspect of the present invention to achieve the objects, a method for transmitting uplink control information at a UE to a BS in a time resource unit including a plurality of OFDM symbols includes: configuring an uplink control channel in the time resource unit; and transmitting the uplink control information in the time resource unit to the BS through the uplink control channel, wherein when the time resource unit includes an interfering OFDM symbol in which interference caused by a downlink control channel occurs, the uplink control channel is configured in a specific format from among a plurality of uplink control channel formats.

In accordance with another aspect of the present invention to achieve the objects, a method for receiving uplink control information at a BS from a UE in a time resource unit including a plurality of OFDM symbols includes: receiving the uplink control information in the time resource unit from the UE through an uplink control channel allocated to the time resource unit, wherein when the time resource unit includes an interfering OFDM symbol in which interference caused by a downlink control channel occurs, the uplink control channel is configured in a specific format from among a plurality of uplink control channel formats.

In accordance with another aspect of the present invention to achieve the objects, a UE for transmitting uplink control information to a BS in a time resource unit including a plurality of OFDM symbols in a TDD system includes: an RF unit configured to transmit/receive signals; and a processor connected to the RF unit and configured to control the RF unit, wherein the processor configures an uplink control channel in the time resource unit and controls the RF unit to transmit the uplink control information to the BS in the time resource unit through the uplink control channel, wherein when the time resource unit includes an interfering OFDM symbol in which interference caused by a downlink control channel occurs, the processor configures the uplink control channel in a specific format from among a plurality of uplink control channel formats.

In accordance with another aspect of the present invention to achieve the objects, a BS for receiving uplink control information from a UE in a time resource unit including a plurality of OFDM symbols in a TDD system includes: an RF unit configured to transmit/receive signals; and a processor connected to the RF unit and configured to control the RF unit, wherein the processor controls the RF unit to receive the uplink control information from the UE through an uplink control channel allocated to the time resource unit, wherein when the time resource unit includes an interfering OFDM symbol in which interference caused by a downlink control channel occurs, the uplink control channel is configured in a specific format from among a plurality of uplink control channel formats.

In the aspects of the present invention, the interfering OFDM symbol may be excluded from the configuration of the uplink control channel using at least one of a first technique using a control channel structure for extended cyclic prefix (CP), which uses a number of OFDM symbols smaller than the number of OFDM symbols of a control channel structure for normal CP, instead of the control channel structure for normal CP, a second technique using an orthogonal sequence shorter than a normal orthogonal sequence when the uplink control information is spread in the time domain, and a third technique of coding the uplink control information at a coding rate higher than a normal coding rate.

In the aspects of the present invention, information indicating whether the time resource unit includes the interfering OFDM symbol may be transmitted from the BS to the UE.

In the aspects of the present invention, the uplink control channel of the specific format may carry the uplink control information spread in two or more OFDM symbols in the uplink control channel.

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantageous Effects of Invention

According to embodiments the present invention, inter-cell interference between neighboring cells can be reduced even though BSs freely configure UL/DL frames/subframes. This improves reliability of uplink and/or downlink transmission so as to enhance throughput of the asymmetric TDD system.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
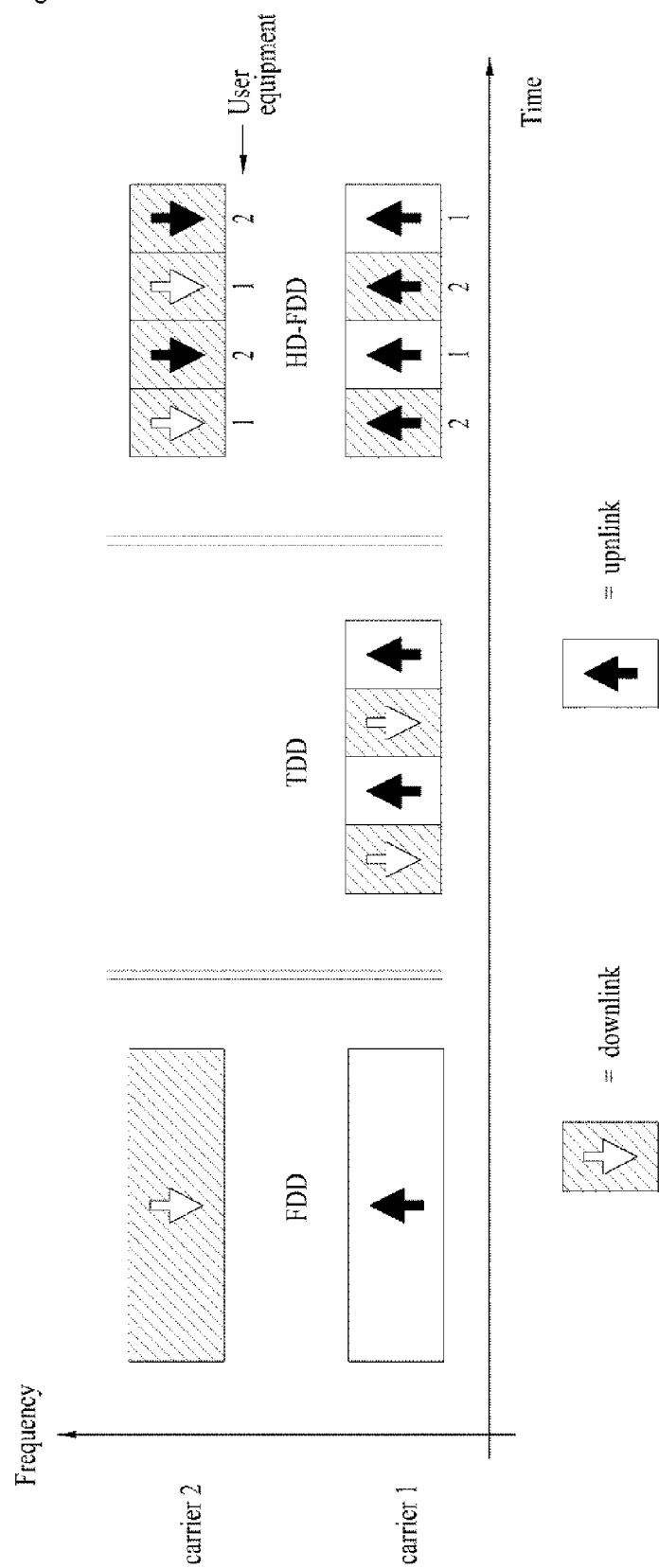
FIG. 1 schematically illustrates three duplex modes used in bidirectional wireless communication.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

In the present invention, the term CELL refers to a geographical region to which a BS or an antenna group provides a communication service. Thus, when it is said that a UE communicates with a specific cell, it means that the UE communicates with a BS, an antenna or an antenna group that provides a communication service to the specific cell. The term DOWNLINK/UPLINK SIGNAL OF A SPECIFIC CELL refers to a downlink/uplink signal with respect to a BS, an antenna or an antenna group that provides a communication service to the specific cell. The term CHANNEL STATE/QUALITY OF A SPECIFIC CELL refers to a channel state/quality of a communication link or a channel established between a UE and an antenna group that provides a communication service to the specific cell. The term INTERFERING CELL refers to a cell that interferes with a specific cell. When a signal of a neighbor cell interferes with a signal of a specific cell, the neighbor cell corresponds to an interfering cell and the specific cell corresponds to a victim cell. When neighboring cells interfere each other or unilaterally, this interference is referred to as inter-cell interference (ICI).

In the present invention, when it is said that a specific signal is allocated to a frame, subframe, slot, carrier, or subcarrier, this means that the specific signal is transmitted through the carrier or subcarrier during a period or timing of the frame, subframe, slot, or symbol.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or resource elements (REs) carrying Downlink Control Information (DCI), a set of time-frequency resources or REs carrying Control Format Indicator (CFI), a set of time-frequency resources or REs carrying downlink ACK/NACK (ACKnowlegement/Negative ACK), and a set of time-frequency resources or REs carrying DL data, respectively. In addition, a Physical Uplink Control CHannel (PUCCH), a Physical Uplink Shared CHannel (PUSCH), and a Physical Random Access CHannel) (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, time-frequency resource or RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Figure 2:
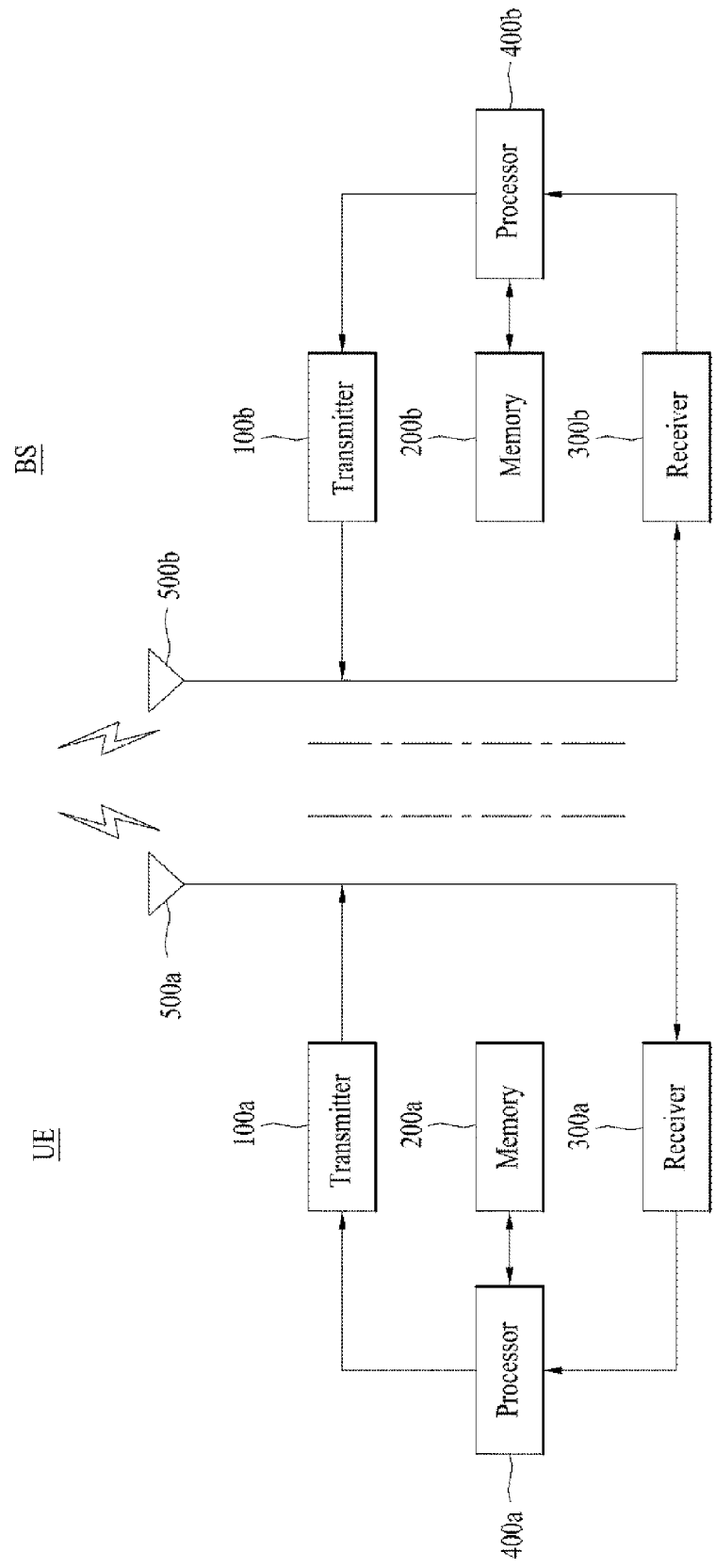
FIG. 2 is a block diagram illustrating components of a user equipment (UE) and a base station (BS) which implement the present invention.

FIG. 2 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas $500a$ and $500b$ for receiving information, data, signals, and/or messages, transmitters $100a$ and $100b$ for transmitting messages by controlling the antennas $500a$ and $500b$, receivers $300a$ and $300b$ for receiving messages by controlling the antennas $500a$ and $500b$, and memories $200a$ and $200b$ for storing information associated with communication in the wireless communication system. The UE and the BS further include processors $400a$ and $400b$, respectively, which are adapted to perform the present invention by controlling the components of the UE and the BS, such as the transmitters $100a$ and $100b$, the receivers $300a$ and $300b$, and the memories $200a$ and $200b$.

The transmitter $100a$, the memory $200a$, the receiver $300a$, and the processor $400a$ in the UE may be configured as independent components on separate chips or their separate chips may be incorporated into a single chip. Likewise, the transmitter $100b$, the memory $200b$, the receiver $300b$, and the processor $400b$ in the BS may be configured as independent components on separate chips or their separate chips may be incorporated into a single chip. The transmitter and the receiver may be configured as a single transceiver or a Radio Frequency (RF) module in the UE or the BS.

The memories $200a$ and $200b$ may store programs required for signal processing and controlling of the processors $400a$ and $400b$ and temporarily store input and output information. The memories $200a$ and $200b$ may store predefined codebooks with respect to each rank. Each of the memories $200a$ and $200b$ may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The antennas $500a$ and $500b$ transmit signals generated from the transmitters $100a$ and $100b$ to the outside, or transfer radio signals received from the outside to the receivers $300a$ and $300b$. The antennas $500a$ and $500b$ may be referred as antenna ports. Each antenna port may correspond to one physical antenna or may be configured into a combination of more than one physical antenna element. In either case, the signal transmitted from each antenna port is not designed to be further deconstructed by the UE receiver ($300a$). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters $100a$ and $100b$ and/or the receivers $300a$ and $300b$ support a Multiple Input Multiple Output (MIMO) function using a plurality of antennas, each of them may be connected to two or more antennas.

The processors $400a$ and $400b$ generally provide overall control to the modules of the UE and the BS. Especially, the processors $400a$ and $400b$ may carry out a control function for performing the present invention, a Medium Access Control (MAC) frame variable control function based on service characteristics and a propagation environment, a power saving mode function for controlling idle-mode operations, a handover function, and an authentication and encryption function. The processors $400a$ and $400b$ may also be referred to as controllers, microcontrollers, microprocessors, microcomputers, etc. The processors $400a$ and $400b$ may be configured in hardware, firmware, software, or their combination. In a hardware configuration, the processors $400a$ and $400b$ may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors $400a$ and $400b$, or may be stored in the memories $200a$ and $200b$ and driven by the processors $400a$ and $400b$.

The transmitters 100a and 100b perform predetermined coding and modulation for signals and/or data, which are scheduled by the processors 400a and 400b or schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b.

The signal processing procedure of the receivers 300a and 300b is the reverse of the signal processing procedure of the transmitters. Specifically, the receivers 300a and 300b perform decoding and demodulation of wireless signals received from the outside through the antennas 500a and 500b and deliver the resulting signals to the corresponding processors 400a and 400b. Each of the antennas 500a and 500b connected to the receivers 300a and 300b may include $N_r$ reception antennas. Each of the signals received through the reception antennas is reconstructed into a base band signal and is then reconstructed into a data stream, which was originally intended to be transmitted by the transmitters 100a and 100b, through multiplexing and MIMO demodulation.

The transmitters 100a and 100b and the receivers 300a and 300b of the UE and the BS may be configured in different manners depending on the procedures of processing transmitted signals and received signals.

Modules including the transmitters 100a and 100b, the receivers 300a and 300b and the antennas 500a and 500b are referred to as radio frequency (RF) units.

Figure 3:
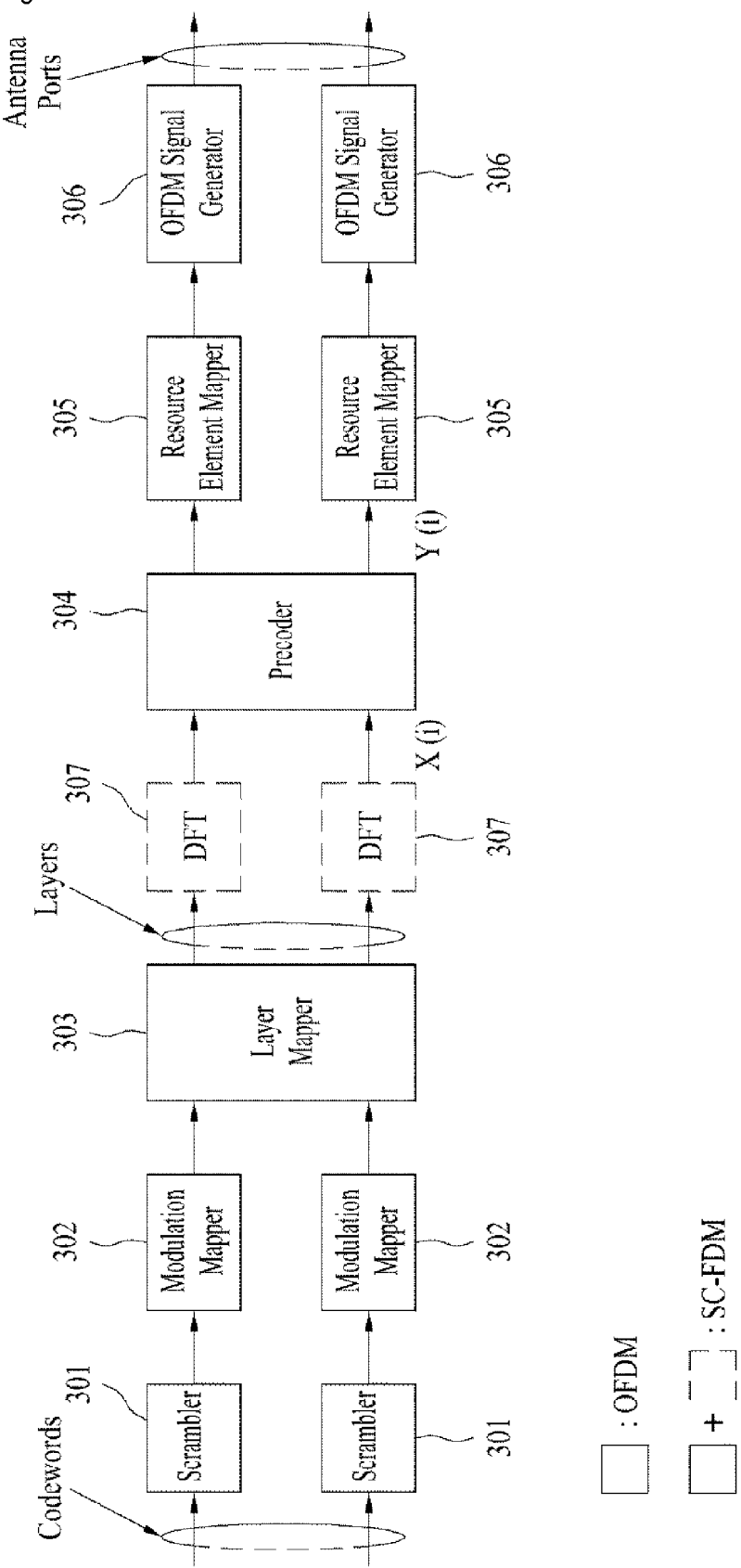
FIG. 3 is a block diagram illustrating an exemplary structure of a transmitter included in the UE and the BS.

FIG. 3 is a block diagram of an exemplary transmitter in each of the UE and the BS. Operations of the transmitters 100a and 100b will be described below in more detail with reference to FIG. 3.

Referring to FIG. 3, each of the transmitters 100a and 100b include scramblers 301, modulation mappers 302, a layer mapper 303, a precoder 304, RE mappers 305, Orthogonal Frequency Division Multiplexing (OFDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t*M_t$ precoding matrix W and output the resulting product in the form of an $N_t*M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM signal generators 306 may include an IFFT module, a CP inserter, a Digital-to-Analog Converter (DAC), a frequency upconverter, etc.

In the meantime, if the transmitter 100a or 100b applies the SC-FDMA scheme to codeword transmission, the transmitter 100a or 100b may include a Discrete Fourier Transform (DFT) module 307 (or Fast Fourier Transform (FFT) module). The DFT module 307 performs DFT or FFT (hereinafter referred to as DFT/FFT) on the antenna specific symbol, and outputs the DFT/FFT symbol to the resource element mapper 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is downconverted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

In the meantime, in the case where the receiver 300a or 300b receives signals according to the SC-FDMA, the receiver 300a or 300b may further include an Inverse Discrete Fourier Transform (IDFT) module (also called an IFFT module). The IDFT/IFFT module performs IDFT/IFFT on an antenna-specific symbol recovered by the resource element mapper, and thus outputs the IDFT/IFFT symbol to the multiplexer.

While it has been described in FIGS. 2 and 3 that each of the transmitters 100a and 100b includes the scramblers 301, the modulation mappers 302, the layer mapper 303, the precoder 304, the RE mappers 305, and the OFDM signal generators 306, it may be further contemplated that the scramblers 301, the modulation mappers 302, the layer mapper 303, the precoder 304, the RE mappers 305, and the OFDM signal generators 306 are incorporated into each of the processors 400a and 400b of the transmitters 100a and 100b. Likewise, while it has been described in FIGS. 2 and 3 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For convenience of description and better understanding of the present invention, it is assumed that the scrambler 301, the modulation mapper 302, the layer mapper 303, the precoder 304, the resource element (RE) mapper 305, and the OFDM signal generator 306 (in case of the SC-FDMA scheme, the DFT module 307 may be further included) are included in the transmitter 100a or 100b separated from the processor 400a or 400b configured to control the operations of the abovementioned constituent elements 302 to 306. In addition, it is assumed that a signal recoverer, a multiplexer, and a channel demodulator may be included in the receiver 300a or 300b included) are contained in the processor 400a or 400b, the embodiments of the present invention may also be applied.

Figure 4:
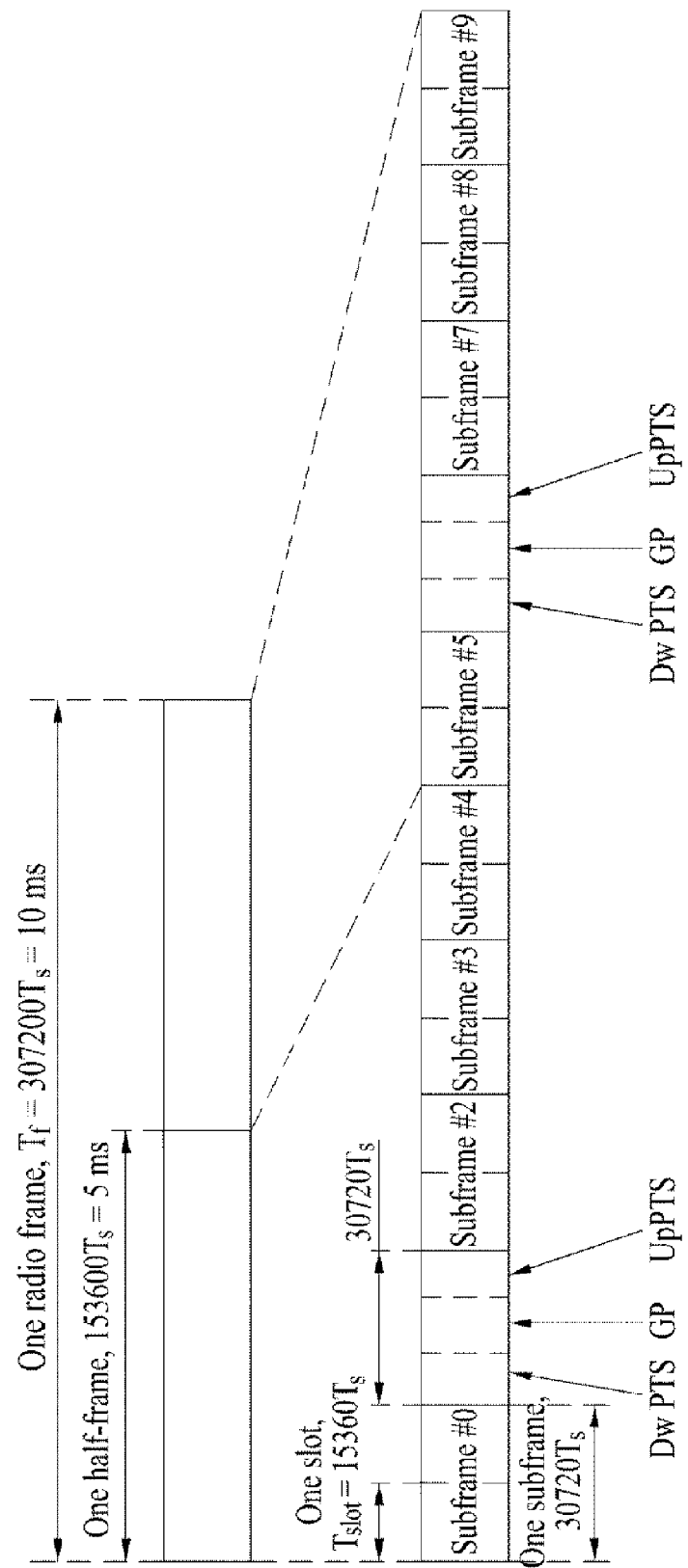
FIG. 4 illustrates a TDD frame structure.

FIG. 4 illustrates an exemplary structure of a radio frame for TDD. Particularly, FIG. 4 illustrates a TDD frame structures used in 3GPP LTE(-A).

Figure 8:
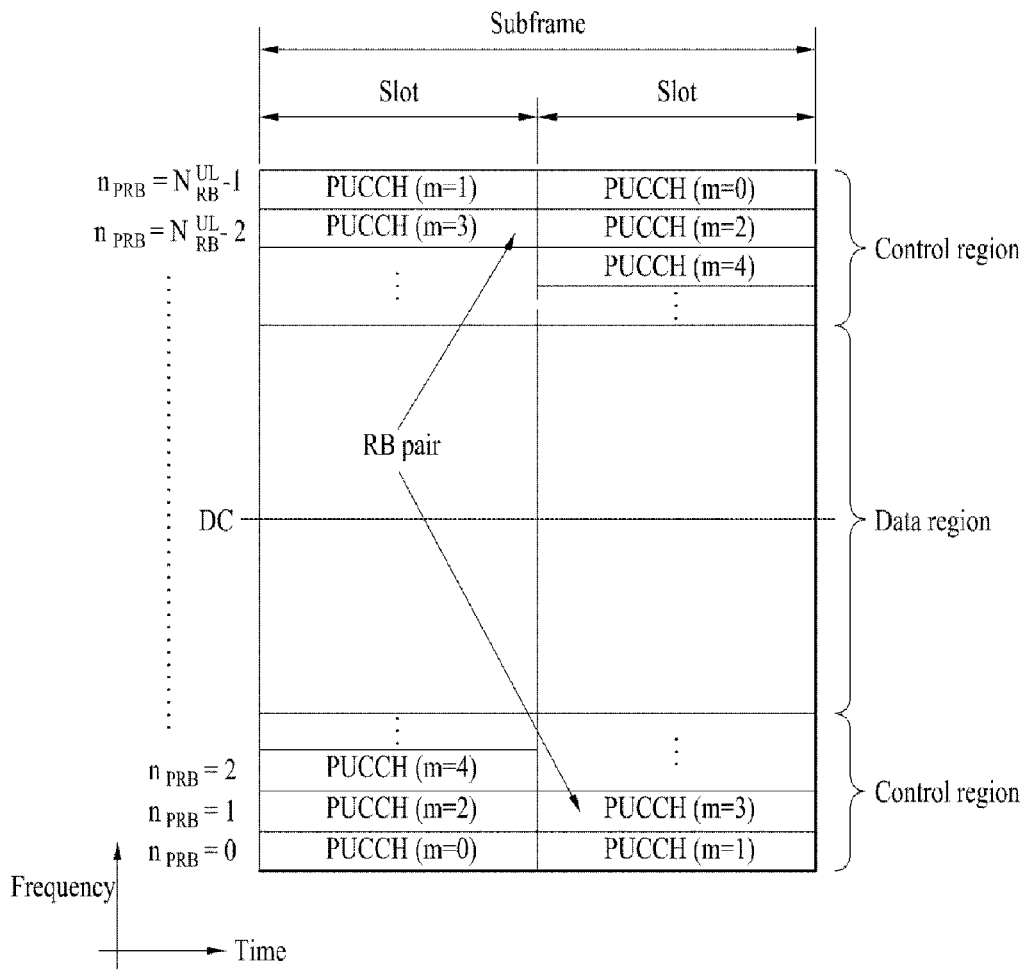
FIG. 8 illustrates an exemplary UL subframe structure in a wireless communication system.

Referring to FIG. 8, a 3GPP LTE/LTE-A radio frame is 10 ms (307,200$T_s$) in duration. The radio frame is divided into 10 equally-sized subframes. Subframe numbers may be assigned to the 10 subframes within the radio frame, respectively. $T_s$ denotes sampling time, where $T_s=1/(2048\times15$ kHz). Each subframe is 1 ms long and further divided into two slots. 20 slots are sequentially numbered from 0 to 19 in a radio frame. Duration of each slot is 0.5 ms. A time interval in which one subframe is transmitted is defined as a Transmission Time Interval (TTI). Time resources may be distinguished by a radio frame number (or radio frame index), a subframe number (or subframe index), a slot number (or slot index), and the like.

In the TDD mode, DL transmission and UL transmission are discriminated according to time, such that subframes contained in a frame may be classified into DL subframes and UL subframes. Table 1 shows an exemplary UL-DL configuration in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | separated from the processor 400a or 400b configured to control the operations of the signal recoverer, the multiplexer and the channel demodulator. However, in the case where the scrambler 301, the demodulation mapper 302, the layer mapper 303, the precoder 304, the RE mapper 305, and the OFDM signal generators 306 and 307 are contained in the processor 400a or 400b, and even in the case where the signal recoverer, the multiplexer, and the channel demodulator (in case of the SC-FDMA scheme, the IFFT module may be further In Table 1, D is a DL subframe, U is a UL subframe, and S is a special subframe. The special subframe denoted by S may include three fields, i.e., Downlink Pilot TimeSlot (DwPTS), Guard Period (GP), and Uplink Pilot TimeSlot (UpPTS). DwPTS is a time period reserved for DL transmission, and UpPTS is a time period reserved for UL transmission. Table 2 shows an exemplary special frame configuration.

TABLE 2

| | Normal cyclic prefix in uplink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Referring to Tables 1 and 2, the 3GPP LTE(-A) system defines various DL/UL configurations. However, since most communication standards so far do not allow the asymmetric TDD, BSs belonging to one network cannot have different DL/UL configurations. That is, communication systems conforming to the standards so far allow only the symmetric TDD in which BSs belonging to the same network communicate with UEs using the same DL/UL configuration.

Figure 5:
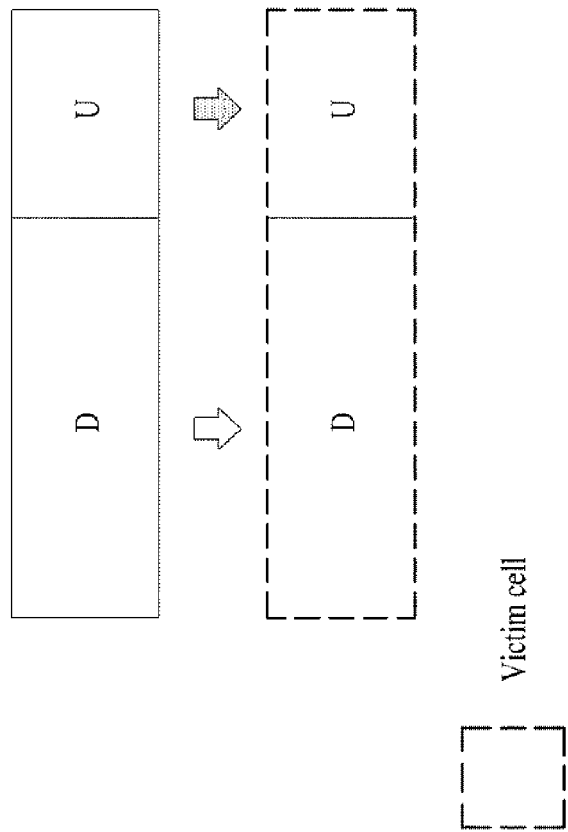
FIG. 5 illustrates the relationship between a victim cell and an interfering cell in a general symmetric TDD system.
Figure 5:
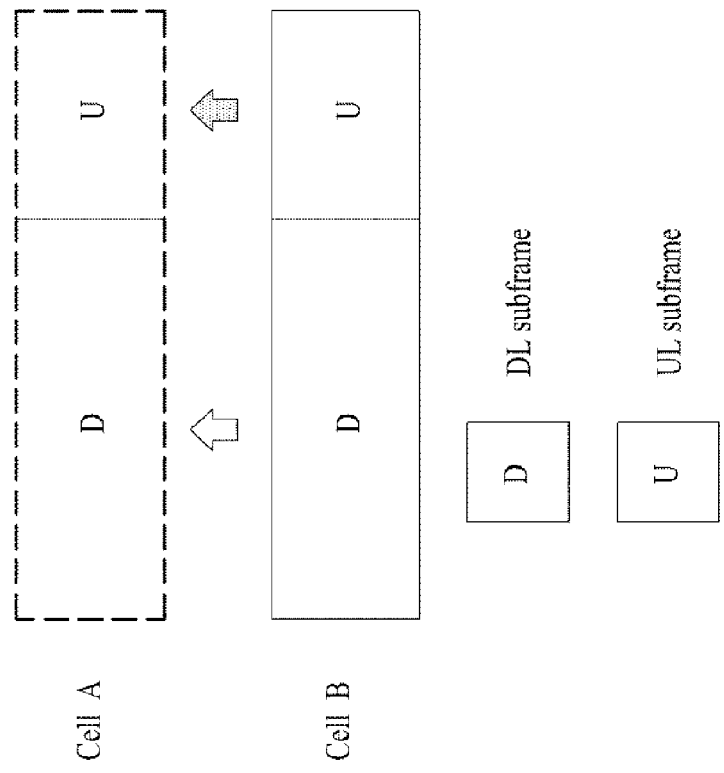

FIG. 5 shows the relationship between a victim cell and an interfering cell in a general symmetric TDD system. In FIG. 5(a), cell B serves as an interfering cell and interferes with cell A serving as a victim cell. In FIG. 5(b), cell A serves as an interfering cell and interferes with the victim cell B.

Referring to FIG. 5, in the symmetric TDD system in which BSs belonging to the same network have to use the same DL/UL configuration, only interference between DLs and/or between ULs exist between neighboring cells.

Accordingly, if the influence of loading at each BS is not considered in the symmetric TDD system, for example, if BSs using the same band perform full loading to allocate signals to all radio resources, ICI occurs uniformly in the time domain on DLs and ULs of cells. In this case, each BS can assume uniform ICI in the time domain. However, the symmetric TDD system deteriorates efficient utilization of resources and does not effectively reflect data loading characteristics of BSs. Accordingly, recent communication standards have attempted to support the asymmetric TDD which can allow BSs to have different DL/UL configurations. When BSs can have different DL/UL configurations, neighboring cells can also have different DL/UL configurations. In this case, interference between the neighboring cells may differ from that in the symmetric TDD system.

Figure 6:
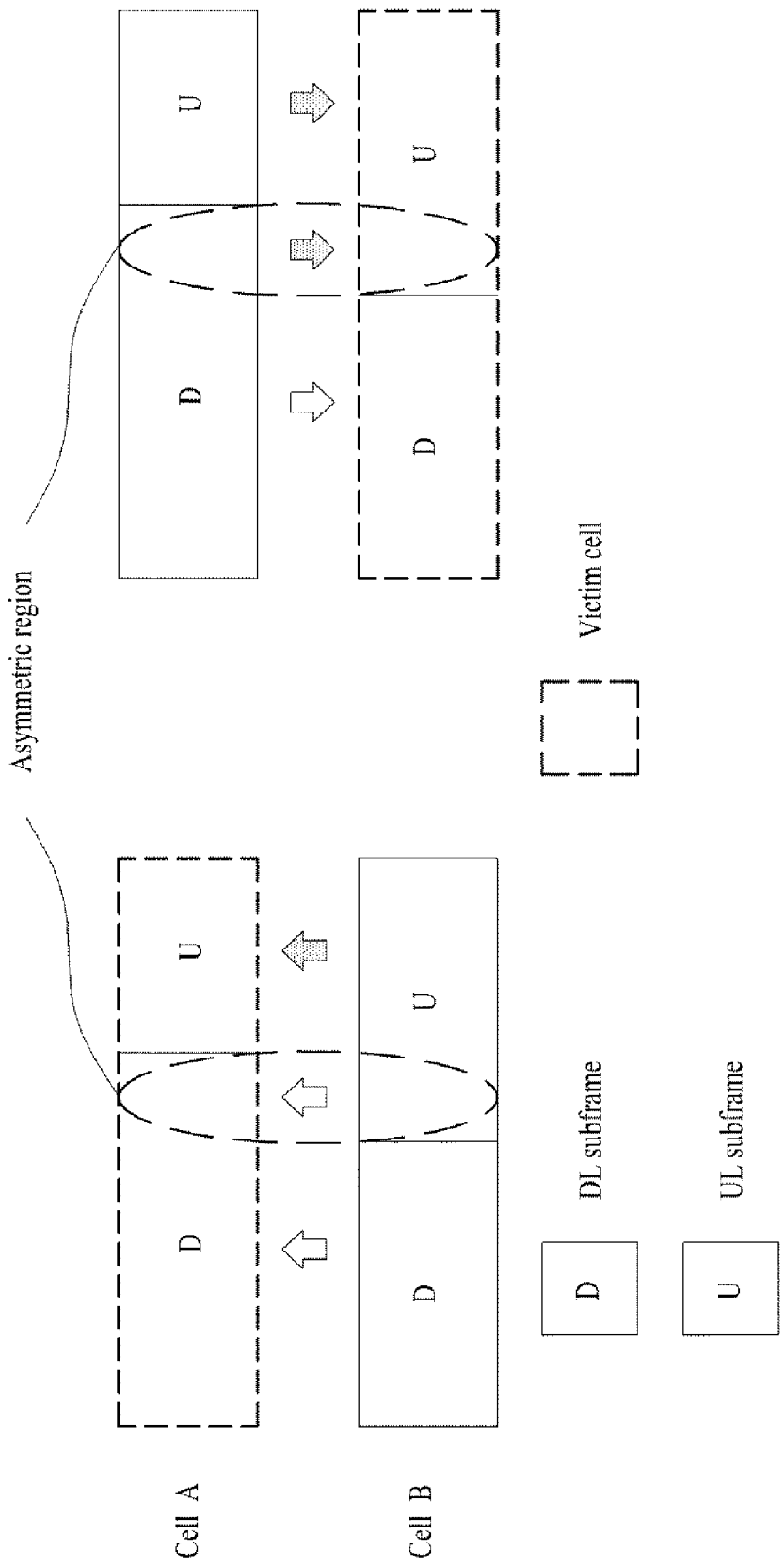
FIG. 6 illustrates the relationship between a victim cell and an interfering cell in a general symmetric TDD system.

FIG. 6 shows the relationship between a victim cell and an interfering cell in an asymmetric TDD system.

Referring to FIG. 6, in the asymmetric TDD system in which BSs using the same band can have different DL/UL configurations, respective cells have different interference forms, resulting in various problems that are not generated in the symmetric TDD system. For instance, distinguished from the symmetric TDD system having only interference between DLs or between ULs, even interference between DL and UL or between UL and DL exists between neighboring cells. Further, since cells may have different DL/UL subframe configurations in a frame, locations of DL/UL control channels may vary in subframes in the asymmetric TDD system, distinguished from the symmetric TDD system in which the locations of the DL/UL control channels are fixed throughout the subframes. This generates additional ICI between DL/UL control channels. A control channel carries information with high significance between a BS and a UE. Particularly, since an area in which a DL control channel transmitted by a BS can be successfully received is generally assumed to be service coverage of the corresponding cell, a range in which the DL control channel can be received is recognized as a measure of service. Therefore, it is very important to correctly transmit control information from a BS to a UE or from the UE to the BS for improvement of communication quality and data throughput. For accuracy of transmission of control information, the BS and the UE use/allocate higher power than that allocated to data channels carrying data for/to control channels. Accordingly, control channels may cause significant interference each other on a time-frequency resource in which they are overlapped. A description will be given of forms of interference that may be generated between control channels and problems caused by the interference with reference to control channels of 3GPP LTE(-A).

Figure 7:
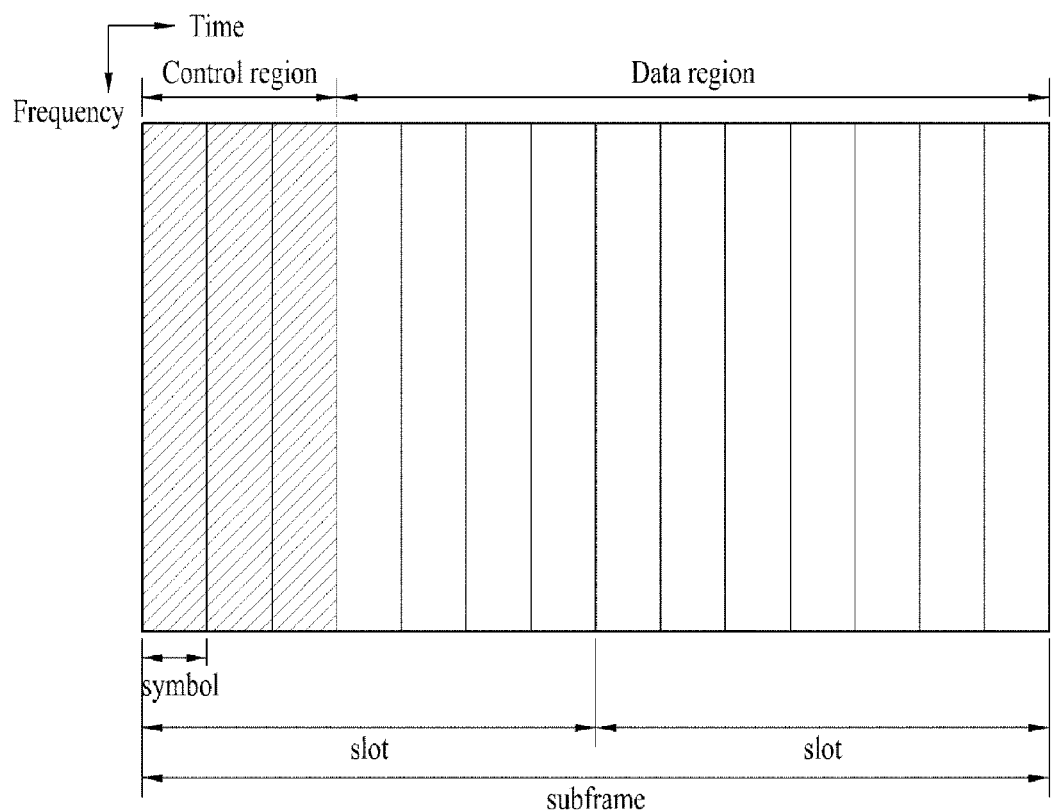
FIG. 7 illustrates a DL subframe structure used in a 3GPP LTE(-A) system.

FIG. 7 illustrates an exemplary structure of a DL subframe in 3GPP LTE(-A) system.

Referring to FIG. 7, each subframe may be divided into a control region and a data region. The control region includes one or more OFDM symbols, starting from the first OFDM symbol. In a DL subframe in the 3GPP LTE(-A) system, the control region is set to a region in which a PDCCH (Physical Downlink Control Channel) may be transmitted, and thus the control region in a DL subframe may be referred to as a PDCCH region.

The number of OFDM symbols used for the control region of a DL subframe may be set independently on a subframe basis and signaled on a PCFICH (Physical Control Format Indicator CHannel). A BS may transmit control information to a UE or UEs in the control region. To transmit control information, a PDCCH, a PCFICH, a PHICH (Physical Hybrid automatic retransmit request Indicator CHannel), etc. may be allocated to the control region.

The BS may transmit information related to resource allocation of a PCH (Paging channel) and DL-SCH (Downlink-shared channel), an uplink scheduling grant, HARQ information, Downlink Assignment Index (DAI), Transmitter Power Control (TPC) command, etc. to each UE or each UE group on a PDCCH.

The BS may transmit data to a UE or UE group in the data region. Data transmitted in the data region is referred to as user data. A PDSCH (Physical Downlink Shared CHannel) may be allocated to the data region to convey user data. PCH (Paging channel) and DL-SCH (Downlink-shared channel) may be transmitted on a PDSCH. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data. For example, it is assumed that a specific PDCCH is CRC-masked with a Radio Network Temporary Identity (RNTI) called A, and information that is transmitted using radio resources B (for example, a frequency location) and transmission format information C (for example, a transmission block size, a modulation scheme, coding information, etc.), is transmitted through a specific subframe. In this case, a UE located in a cell monitors PDCCH using its own RNTI information. If at least one UE having the RNTI A is present, the UEs receive PDCCH and receive PDSCH indicated by B and C through the received PDCCH information.

Multiple PDCCHs may be transmitted in a control region. The UE monitors the multiple PDCCHs so as to detect its own PDCCH.

FIG. 8 illustrates an exemplary structure of a UL subframe in the wireless communication system.

Referring to FIG. 8, a UL subframe may be divided into a data region and a control region in the frequency domain. In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$) in a frequency upconversion process caused by the OFDM signal generator 306.

One or more Physical Uplink Control CHannels (PUCCHs) may be allocated to the control region to deliver Uplink Control Information (UCI). A PUCCH used for the UE to transmit UCI is allocated by the BS and signaled to the UE implicitly or explicitly. One or more Physical Uplink Shared Channels (PUSCHs) may be allocated to the data region to deliver user data. A PDSCH used for the UE to transmit user data is allocated by the BS and signaled to the UE through a PDCCH delivered to the UE.

The UCI carried by one PUCCH has different sizes and usages according to the PUCCH format, and the UCI size may be changed according to the coding rate. For example, the PUCCH format may be defined as follows.

TABLE 3

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to FIG. 3, PUCCH format 1, 1a and 1b and PUCCH format 3 are mainly used to transmit ACK/NACK information and PUCCH format 2 is used to carry channel status information such as CQI/PMI/RI.

FIGS. 9, 10, 11 and 12 illustrate UCI transmission according to PUCCH formats.

In the 3GPP LTE(-A) system, a DL/UL subframe includes two slots. Each DL/UL slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. Accordingly, a DL/UL subframe with normal CP consists of 2 slots each of which includes 7 OFDM symbols, and a DL/UL subframe with extended CP consists of 2 slots each of which includes 6 OFDM symbols. Since the number of OFDM symbols per subframe varies depending on a CP length, a structure of transmission of a PUCCH in a UL subframe also varies with the CP length. Accordingly, a method by which the UE transmits UCI varies depending on a PUCCH format and a CP length.

Figure 9:
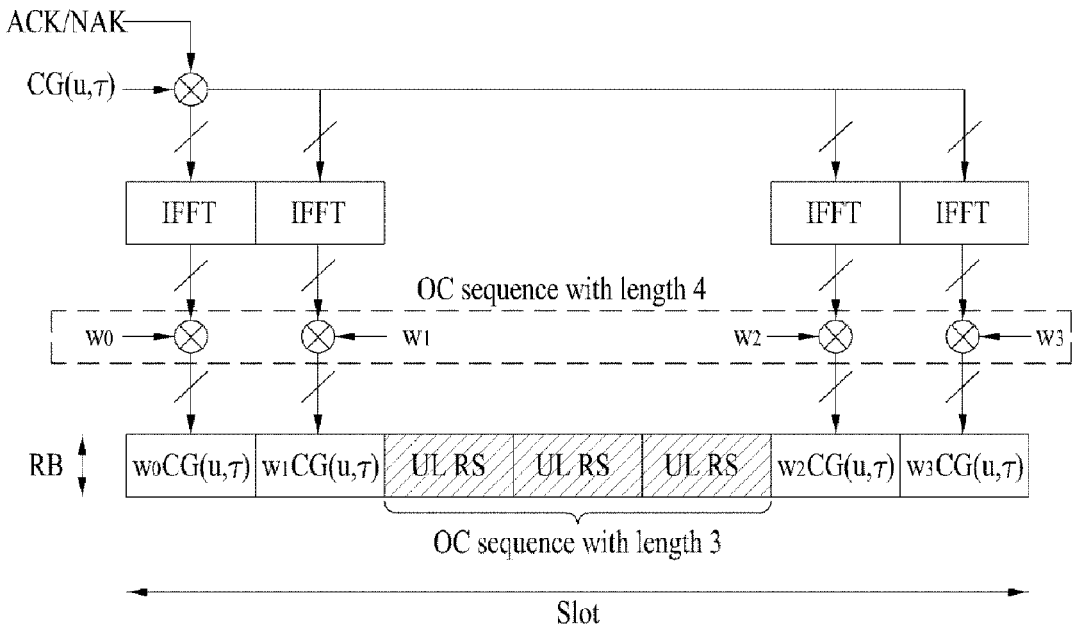
FIGS. 9, 10, 11 and 12 illustrates UCI transmission according to PUCCH formats.
Figure 10:
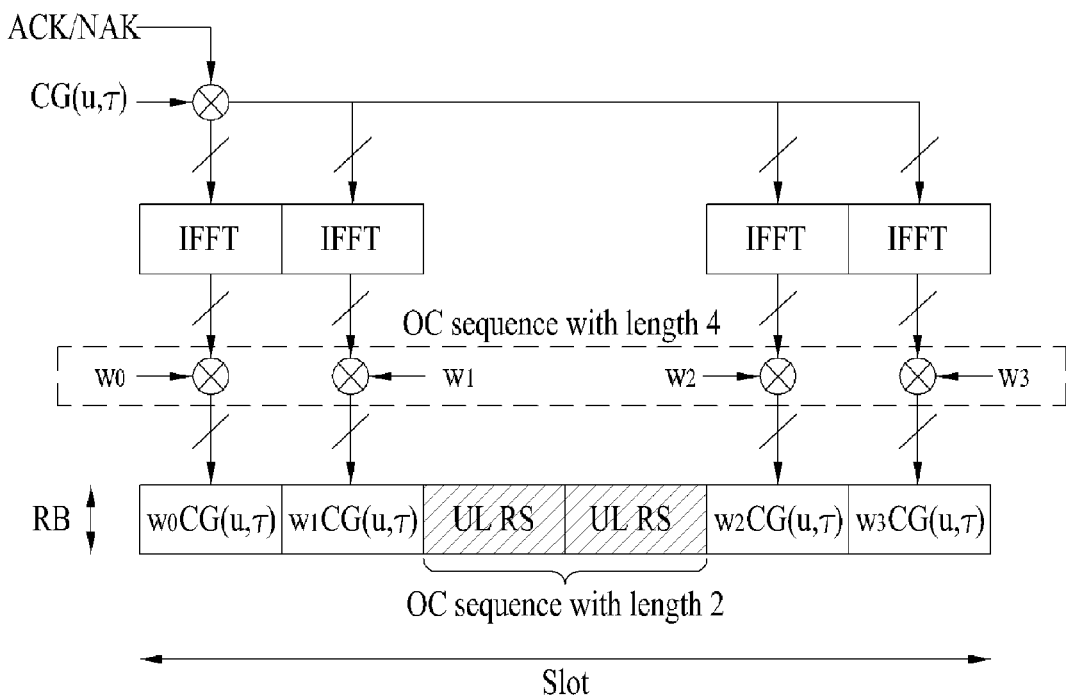

FIG. 9 shows an example of transmitting ACK/NACK information using PUCCH format 1a/1b in a UL slot with normal CP and FIG. 10 shows an example of transmitting AKC/NACK information using PUCCH format 1a/1b in a UL slot with extended CP.

Referring to FIGS. 9 and 10, in the PUCCH format 1a and 1b structure, the same control information may be repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). The orthogonal cover is also referred to as an orthogonal sequence. For example, OC may include a Walsh/DFT orthogonal code. Provided that the number of CSs is 6 and the number of OCs is 3, a total of 18 UEs may be multiplexed in the same PRB on the basis of one antenna. Orthogonal sequences (w0, w1, w2, w3) may be applied to either an arbitrary time domain (after FFT modulation) or an arbitrary frequency domain (before FFT modulation). The PUCCH format 1 slot level structure for Scheduling Request (SR) transmission may be identical to the PUCCH format 1a and 1b, but the PUCCH format 1 slot level structure and the PUCCH format 1a and 1b structure have different modulation methods.

Figure 11:
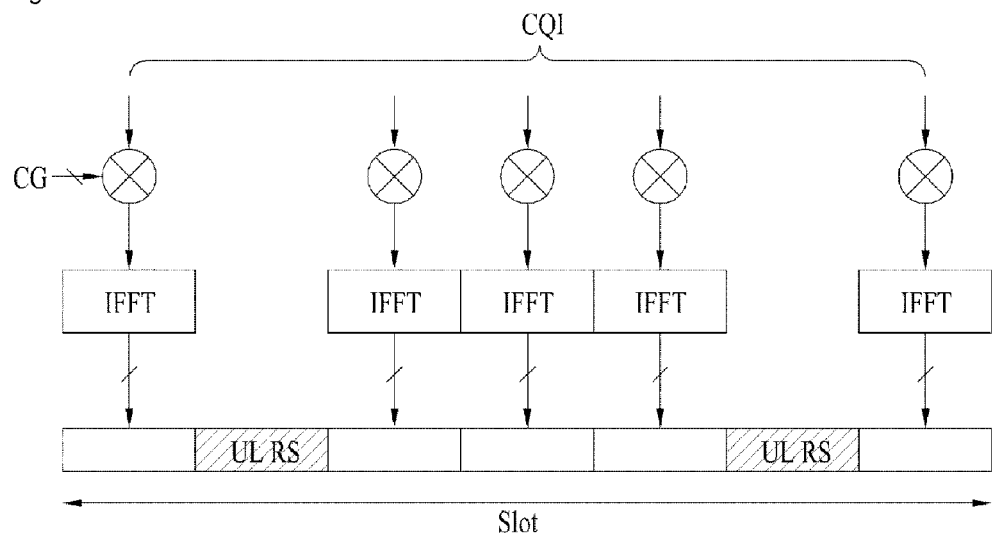
Figure 12:
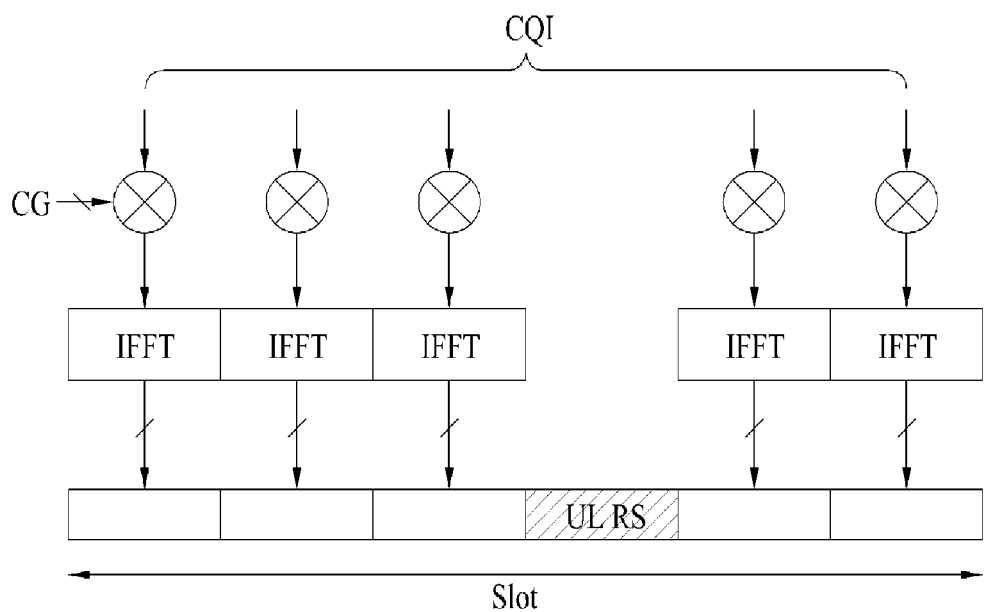

FIG. 11 shows an example of transmitting channel status information using PUCCH format 2/2a/2b in a UL slot with normal CP and FIG. 12 shows an example of transmitting channel status information using PUCCH format 2/2a/2b in a UL slot with extended CP.

Referring to FIGS. 11 and 12, in case of a normal CP, one UL subframe includes 10 OFDM symbols except symbols carrying UL reference signals (RSs). Channel status information is coded into 10 transport symbols (which are also referred to as complex modulation symbols) through block coding. The 10 transport symbols are respectively mapped to the 10 OFDM symbols and transmitted to the BS.

Figure 13:
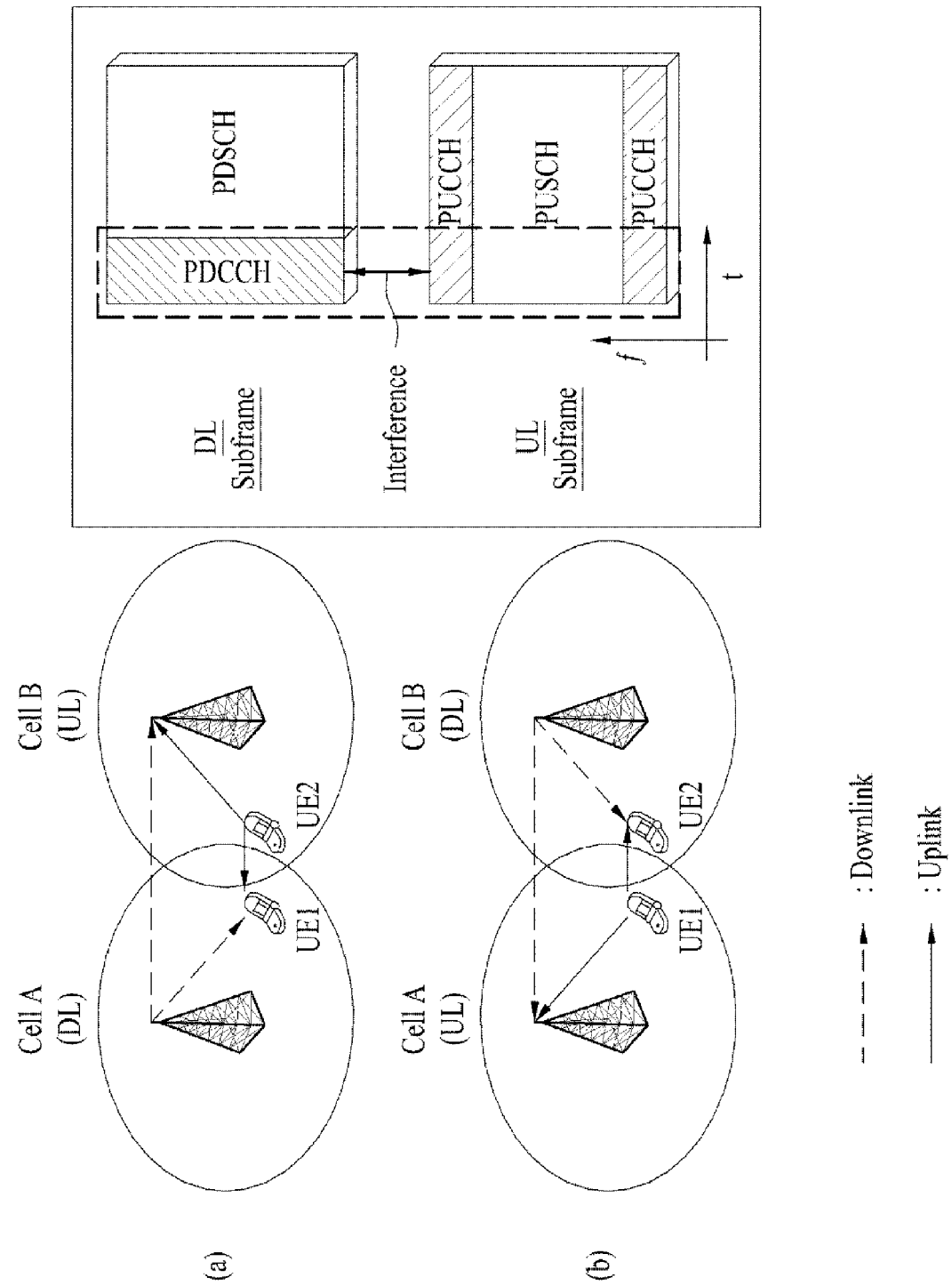
FIG. 13 illustrates ICI that may occur between a DL subframe and a UL subframe transmitted from different cells in the 3GPP LTE(-A) system.

FIG. 13 illustrates ICI that may be generated between a DL subframe and a UL subframe transmitted by different cells in a 3GPP LTE(-A) TDD system.

Referring to FIG. 13(a), a DL signal received by UE1 located at the boundary of cell A from cell A may be interfered by a UL signal transmitted by UE2 located in proximity to UE1 to cell B. Referring to FIG. 13(b), a UL signal transmitted by UE1 to cell A may be interfered by a DL signal received by UE2 from cell B although the interference is weaker than the interference on the DL signal of UE1 caused by the UL signal of UE2.

Referring to FIG. 13(a), some or all of control channels of neighboring cells may collide with each other depending on a DL/UL subframe configuration. Successful transmission of control channels is directly connected with service coverage of the UE/BS, and thus the control channels use high transport power, in general. This causes significant interference between a DL control channel and a UL control channel. Accordingly, a DL/UL control channel of a UE located at the boundary of a cell may be significantly interfered by a UL/DL control channel of a neighbor cell.

Interference between DLs or interference between ULs has occurred in the symmetric TDD system, and thus the existing interference mitigation scheme can be used to relieve the interference. However, since interference between a DL and a UL or between a UL and a DL is newly generated in the asymmetric TDD system, a scheme for mitigating this interference is required.

It is possible to consider a scheme of avoiding collision between a DL control channel and a UL control channel using the existing system. However, it is practically difficult to prevent a DL control channel and a UL control channel from collision in the existing system because BSs do not change TDD DL/UL configurations once they set them. In addition, a scheme can be considered that mitigates ICI by reducing power of one of a DL control channel and a UL control channel in the existing system. However, this scheme has a disadvantage that when the power of a control channel is reduced, transmission reliability of that control channel decreases. The method of increasing transmission accuracy of a control channel at the sacrifice of another control channel is not appropriate because all the UL/DL control channels have high significance. Further, the structures of control channels have many components connected with a higher layer such as RRC layer, and thus it is difficult to change the structures of the control channels.

Therefore, the present invention proposes an appropriate scheme for solving the problem of collision between control channels of neighboring cells in an asymmetric TDD environment. For reference, while ICI may occur between cells managed by the same BS, embodiments of the present invention will be described on the assumption that different cells are controlled by different BSs for convenience of explanation. Notably, the embodiments of the present invention can be applied when cells use different UL/DL configurations even if the cells are controlled by the same BS. The embodiments of the present invention will be described on the condition that a BS linked with a UE is a serving BS and a geographical area in which the UE is provided with a communication service by the serving BS is a serving cell. Further, a cell that is located in proximity to the serving cell and affects UL/DL signals of the serving cell or is affected by the UL/DL signals is referred to as a neighbor cell, and a BS controlling the neighbor cell is referred to as a neighbor BS.

[First Scheme]

Figure 14:
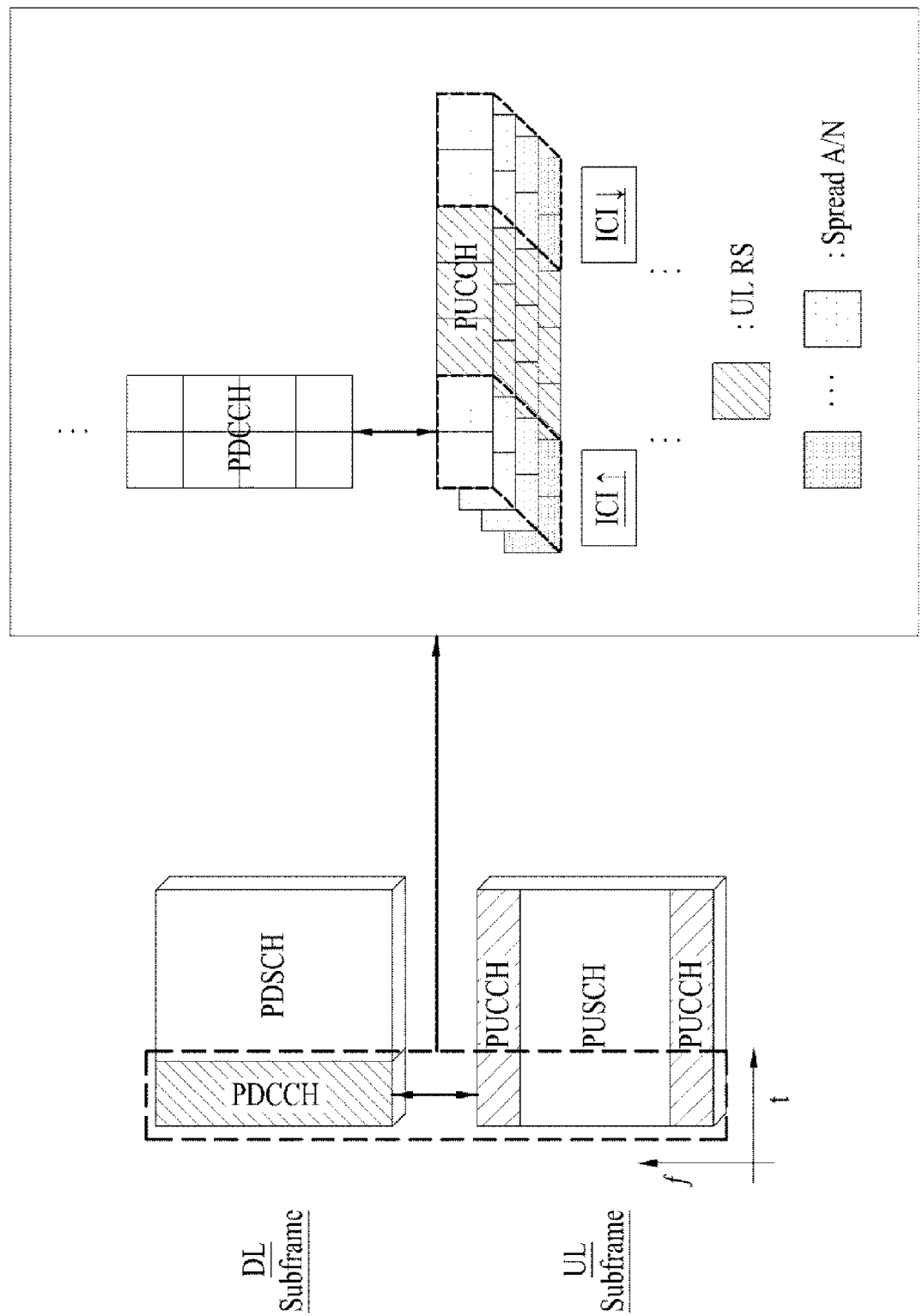
FIG. 14 illustrates the concept of a first scheme of the present invention for mitigating collision between a DL control channel and a UL control channel.

FIG. 14 illustrates the concept of the first scheme of the present invention for mitigating collision between a DL control channel and a UL control channel.

The first scheme of the present invention mitigates ICI by allowing only a DL/UL control channel format having minimum ICI or relatively small influence of ICI from among DL/UL control channel formats when interference is generated between neighboring cells due to an asymmetric TDD scheme.

A DL control channel and a UL control channel are generated and allocated by different methods and they occupy different frequency/time positions in a subframe. Accordingly, if only a control channel format that can reduce interference between the DL control channel and the UL control channel is allowed in the asymmetric TDD system, collision between the DL control channel and the UL control channel is minimized so as to decrease the interference.

Therefore, the first scheme of the present invention permits only a specific PUCCH format, for example, PUCCH format 1/1a/1b, in a UL subframe transmitted on the same frequency band by neighboring BSs when a DL subframe and the UL subframe collide with each other. In periods other than the corresponding subframes, that is, periods in which DL transmission by one BS and UL transmission by the other BS do not collide with each other, PUCCH formats are used as in the conventional systems. In the present invention, collision between a DL subframe/slot/OFDM symbol/channel and a UL subframe/slot/OFDM symbol/channel means allocation and transmission of channels in opposite directions by neighboring BSs in a predetermined subframe/slot/OFDM symbol period. For instance, when a BS assigns DL transmission to a certain subframe/slot/OFDM symbol and a neighbor BS assigns UL transmission thereto, this will be described in the following as collision between a DL subframe/slot/OFDM symbol and a UL subframe/slot/OFDM symbol or collision between DL transmission and UL transmission.

A serving BS according to the first scheme of the present invention can notify a UE linked thereto of a UL subframe colliding with a DL subframe of an interfering BS. The serving BS can also notify the UE of a PUCCH format allowed in the colliding UL subframe. The UE transmits UCI using only the allowed PUCCH format in the UL subframe on the basis of the notification of the BS. Alternatively, an allowable PUCCH format may be previously determined and the serving BS may notify the UE of only the UL subframe colliding with the DL subframe of the interfering BS. Then, the UE transmits UCI using only the previously determined PUCCH format in the notified UL subframe.

Referring to FIG. 14, a PUCCH transmitted on leading OFDM symbols of a UL subframe collides with a PDCCH transmitted by a neighbor BS. Block coded channel status information of the PUCCH with format 2/2a/2b is segmented and respectively transmitted through a plurality of OFDM symbols. That is, OFDM symbols allocated with the PUCCH in format 2/2a/2b have different information items in view of the time domain. Accordingly, if part of the PUCCH, transmitted in some of the OFDM symbols (two leading OFDM symbols in FIG. 14), is damaged due to interference of the PDCCH, the BS cannot decode the channel status information carried by the PUCCH since it cannot be aware of block-coded form of UCI, that is, coded UCI form. Therefore, when a PUCCH in format 2/2a/2b is interfered by a PDCCH, channel status information carried by the PUCCH may be lost. On the other hand, according to PUCCH format 1/1a/1b carrying ACK/NACK information on a PDSCH, the ACK/NACK information is spread in the frequency/time domain and transmitted in one subframe (refer to FIG. 9). When UCI is transmitted using PUCCH format 1/1a/1b in this manner, the UCI is spread in the time domain fundamentally, and then transmitted on a plurality of OFDM symbols. Even when the PUCCH is considerably interfered by the PDCCH in some of the OFDM symbols, less interference is applied to the PUCCH from the remaining OFDM symbols. Accordingly, the BS can recover the UCI transmitted from the UE using a signal received from the remaining OFDM symbols even when some signals are damaged in an OFDM symbol period interfered by the PDCCH.

Therefore, according to the embodiment (referred to as a first embodiment hereinafter) based on the first scheme of the present invention, since only a PUCCH format relatively robust against interference by a PDCCH is allowed, the possibility that each BS successfully detects/receives UCI transmitted by a UE increases even if UL transmission and DL transmission collide with each other between neighboring BSs. Further, the first embodiment of the present invention can be implemented using the existing frame structure by introducing only simple signaling for informing the UE of a colliding UL subframe and/or the allowed PUCCH format.

[Second Scheme]

Figure 15:
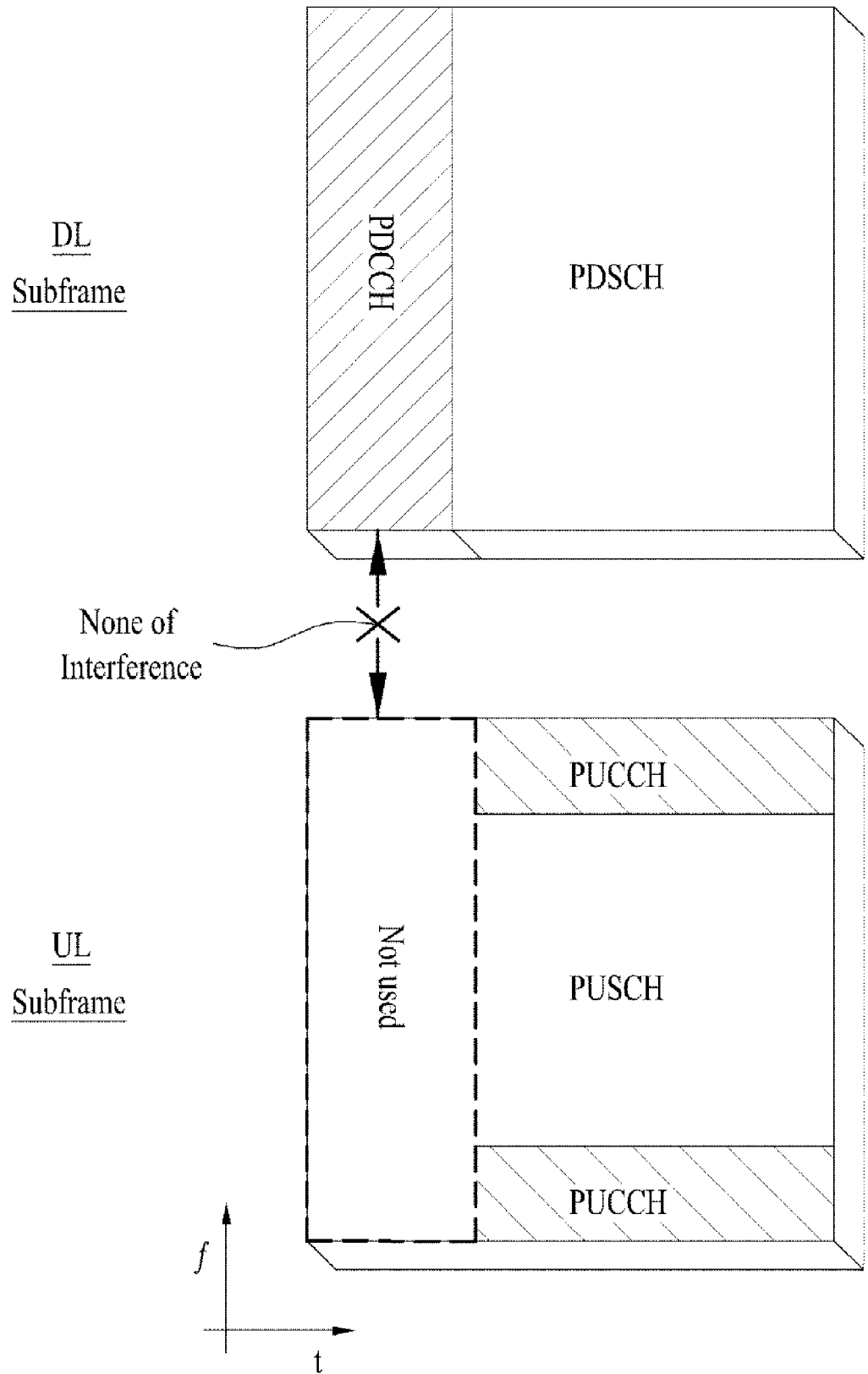
FIG. 15 illustrates the concept of a second scheme of the present invention for mitigating collision between a DL control channel and a UL control channel.

FIG. 15 illustrates the concept of a second scheme of the present invention for mitigating collision between a DL control channel and a UL control channel.

The second scheme of the present invention mitigates ICI by reducing the number of OFDM symbols occupied by a UL control channel and/or a data channel to decrease or eliminate a symbol period colliding with a DL control channel. Referring to FIG. 15, if a UE and a BS know a period (for example, an OFDM symbol period) in which a UL control channel and a DL control channel collide with each other, the UE and the BS may not use the period for UL transmission as far as possible. For example, in case of a PUCCH, the PUCCH is configured such that the PUCCH is not transmitted in all or some of OFDM symbols including a PDCCH transmitted by a neighbor BS. Alternatively, since part of a PUSCH transmitted by the UE may interfere with the PDCCH, the UE may not use OFDM symbol(s) as far as possible by puncturing or muting the OFDM symbol(s) in which the PDCCH is transmitted. The UE can perform rate matching for data of the PUSCH such that the PUSCH can be transmitted on OFDM symbols other than the corresponding OFDM symbol(s) from among OFDM symbols of a UL subframe.

The serving BS can transmit to the UE information indicating a UL subframe/slot or OFDM symbol in which UL transmission and DL transmission collide with each other. Otherwise, the UE can detect signals of neighbor cells so as to determine a UL subframe/slot or OFDM symbol in which DL transmission by a neighbor cell(s), which will collide with UL transmission by the UE, is present.

According to the second scheme of the present invention, since all or some of OFDM symbol(s) including a PDCCH transmitted by a neighbor cell are not used for UL transmission, it is possible to mitigate or eliminate interference by the UL transmission on the neighbor cell. Further, it is possible to alleviate or remove interference by the PDCCH on the PUCCH transmitted by the UE.

FIGS. 16 to 22 illustrate second, third and fourth embodiments of the present invention for mitigating ICI according to the second scheme of the present invention.

FIGS. 16, 17, 18 and 19 illustrate methods for transmitting a UL control channel and a DL control channel at neighboring cells according to the second embodiment of the present invention.

In the 3GPP LTE system, UL control channels have different structures according to whether its CP type is a normal CP or an extended CP even if they have the same format. For example, referring to FIG. 9, in PUCCH format 1/1a/1b for normal CP, among seven OFDM symbols included in a slot with normal CP, central three symbols carry RSs and the remaining four OFDM symbols carry UCI which has been spread and mapped to the four OFDM symbols. On the contrary, in PUCCH format 1/1a/1b for extended CP, referring to FIG. 10, among six OFDM symbols included in a slot with extended CP, central two OFDM symbols carry RSs and the remaining four OFDM symbols carry UCI which has been spread and mapped to the four OFDM symbols. Alternatively, in PUCCH format 2/2a/2b for normal CP, referring to FIG. 11, among seven OFDM symbols included in a slot with normal CP, second and sixth OFDM symbols carry RSs and first, third, fourth, fifth and seventh OFDM symbols carry UCI segmented and mapped to them. On the contrary, in PUCCH format 2/2a/2b for extended CP, referring to FIG. 12, among six OFDM symbols included in a slot with extended CP, the fourth OFDM symbol carries a RS and first, second, third, fifth and sixth OFDM symbols carry UCI segmented and mapped to them.

That is, control channels of PUCCH format 1/1a/1b/3 carry ACK/NACK information on a PDSCH and control channels of PUCCH format 2/2/2b carry channel status information (e.g., channel quality indicator (CQI), rank index (RI), precoding matrix index (PMI), etc.) or simultaneously carry the channel status information and ACK/NACK information. The number of OFDM symbols included in a subframe with extended CP is smaller than the number of OFDM symbols of a subframe with normal CP by 1. By using this characteristic, the second scheme of the present invention restricts PUCCH formats that can be used by the UE according to PDCCH loads of neighbor cells (according to the number of OFDM symbols, indicated by a PCFICH, 1, 2 or 3).

Referring to FIGS. 16, 17, 18 and 19, when a neighbor cell transmits a PDCCH in a UL subframe to which a PUCCH is allocated by the UE, the UE transmits the PUCCH using a PUCCH format for extended CP in the first slot of the UL subframe including OFDM symbols having normal CP and using a PUCCH format for normal CP or the PUCCH format for extended CP in the second slot.

Figure 16:
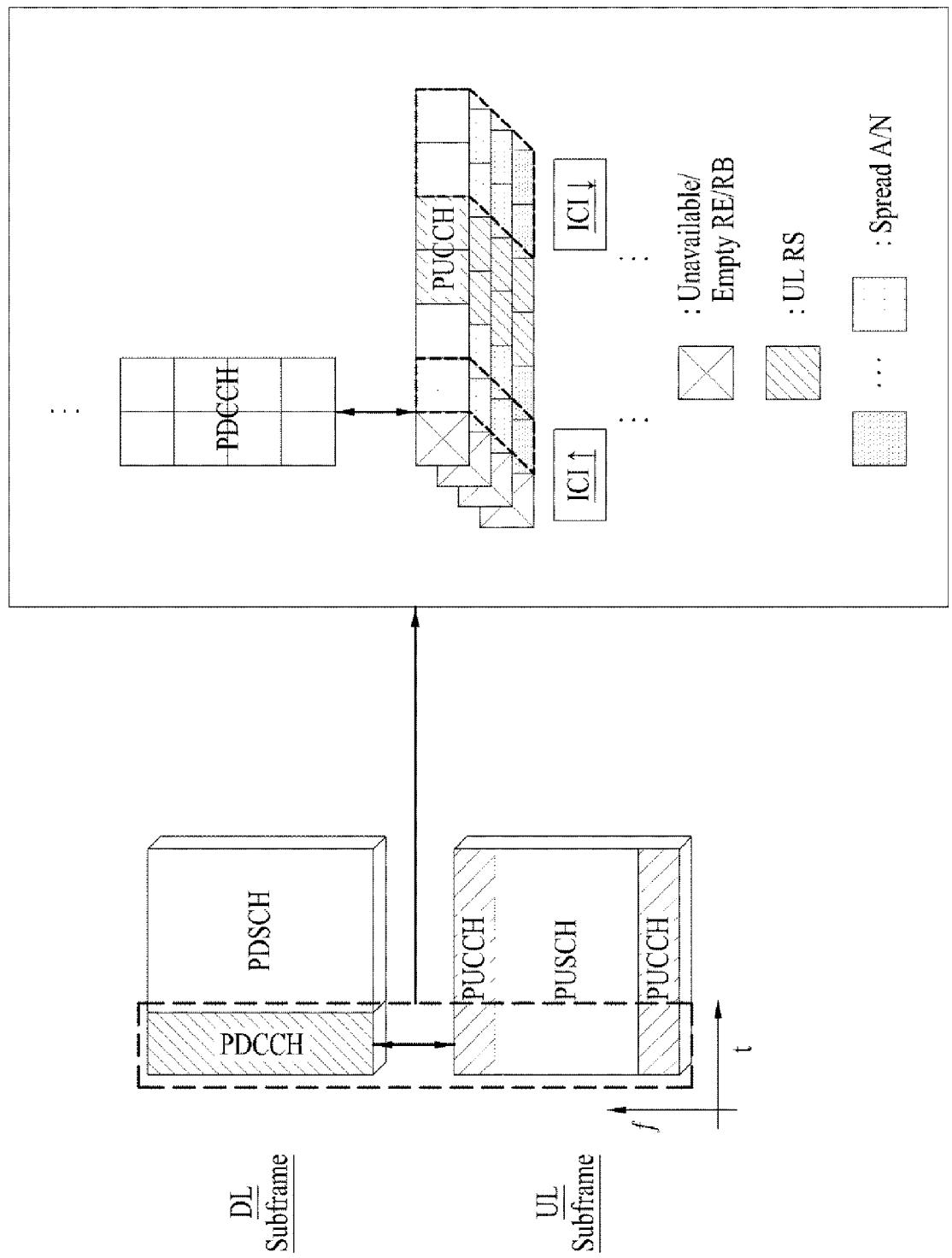
FIGS. 16 to 22 illustrate second, third and fourth embodiments of the present invention for mitigating inter-cell interference according to the second scheme of the present invention.
Figure 17:
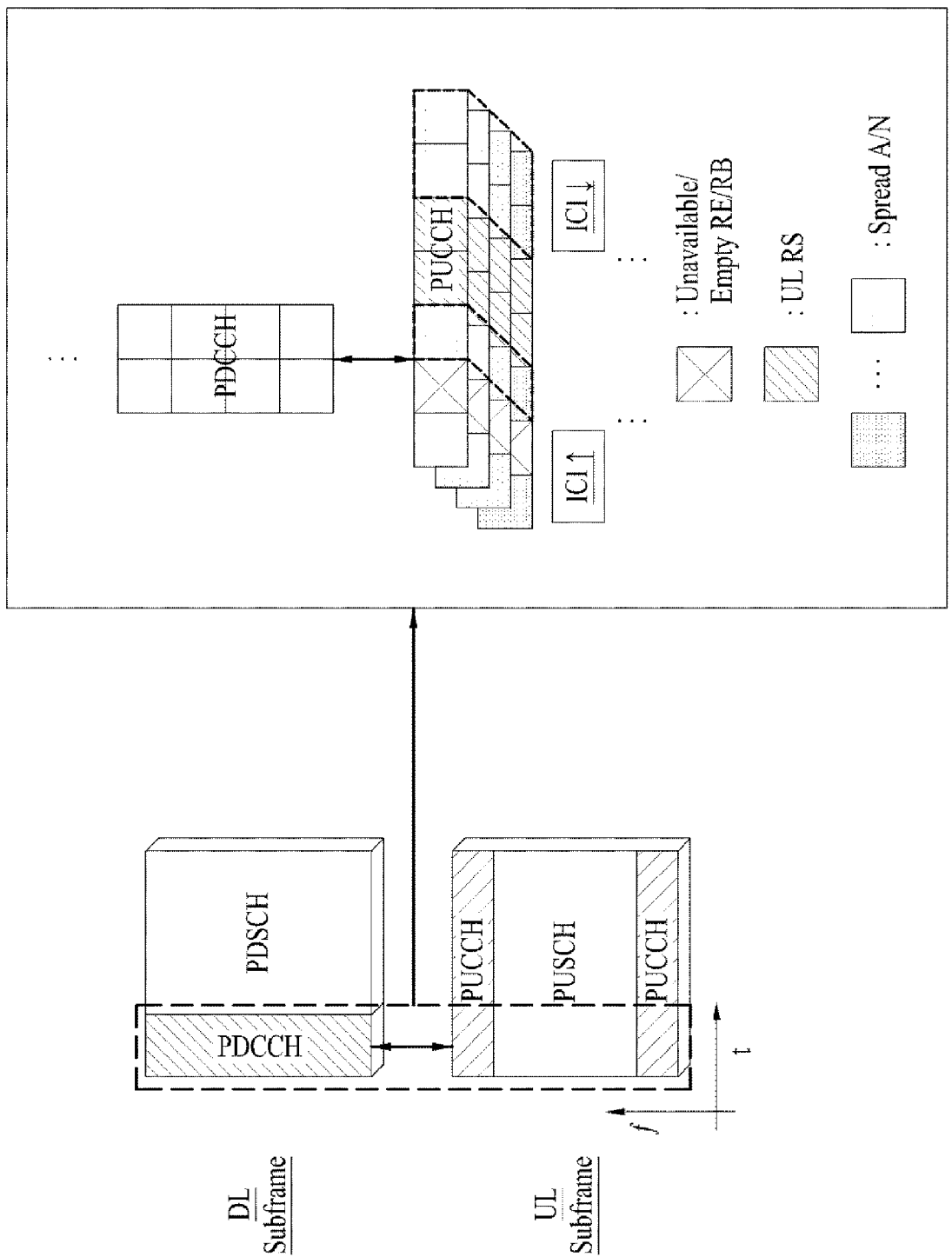

FIGS. 16 and 17 illustrate cases in which the second embodiment of the present invention is applied to PUCCH format 1/1a/1b or 3.

Referring to FIG. 16, when the boundary of a DL subframe of a neighbor cell corresponds to the boundary of a UL subframe of a serving cell, the UE may not use the first OFDM symbol of the first slot in the UL subframe having normal CP for PUCCH transmission by using a PUCCH format for extended CP instead of a PUCCH format for normal CP in the first slot in the UL subframe having normal CP.

Referring to FIG. 17, when the boundary of the DL subframe of the neighbor cell does not correspond to the boundary of the UL subframe of the serving cell, the UE may not use one OFDM symbol occupied by a PDCCH region of a neighbor cell for PUCCH transmission by using a PUCCH format for extended CP instead of a PUCCH format for normal CP in a UL slot in which collision with the PDCCH region of the neighbor cell exists. For example, when the PDCCH region of the neighbor cell occupies the second OFDM symbol of a UL slot of the UE, the UE can perform PUCCH transmission by applying a PUCCH format for extended CP to six OFDM symbols other than the second OFDM symbol among seven OFDM symbols of the UL slot. That is, the UE can avoid or reduce ICI with the PDCCH region of the neighbor cell by adjusting the location of an OFDM symbol which is not used for the PUCCH transmission.

In case of PUCCH format 1/1a/1b or 3, the second embodiment of the present invention can be applied irrespective of the number of OFDM symbols occupied by the PDCCH region of the neighbor cell. When the PDCCH region of the neighbor cell occupies one OFDM symbol, the UE can transmit UCI to the BS of the serving cell without generating ICI with a PDCCH transmitted in the OFDM symbol of the PDCCH region by using PUCCH format 1/1a/1b/3 for extended CP instead of PUCCH format 1/1a/1b/3 for normal CP. When the PDCCH region of the neighbor cell occupies two or more OFDM symbols, the UE can reduce the number of time-frequency resources (particularly, time resources) in which a PDCCH transmitted by a BS of the neighbor cell and a PUCCH transmitted by the UE collide with each other by using PUCCH format 1/1a/1b/3 for extended CP instead of PUCCH format 1/1a/1b/3 for normal CP. Even if the BS receives a signal damaged in some OFDM symbols, the BS can recover UCI in PUCCH format 1/1a/1b/3 using a signal received from other OFDM symbols since the UCI is spread and transmitted in the time domain.

Figure 18:
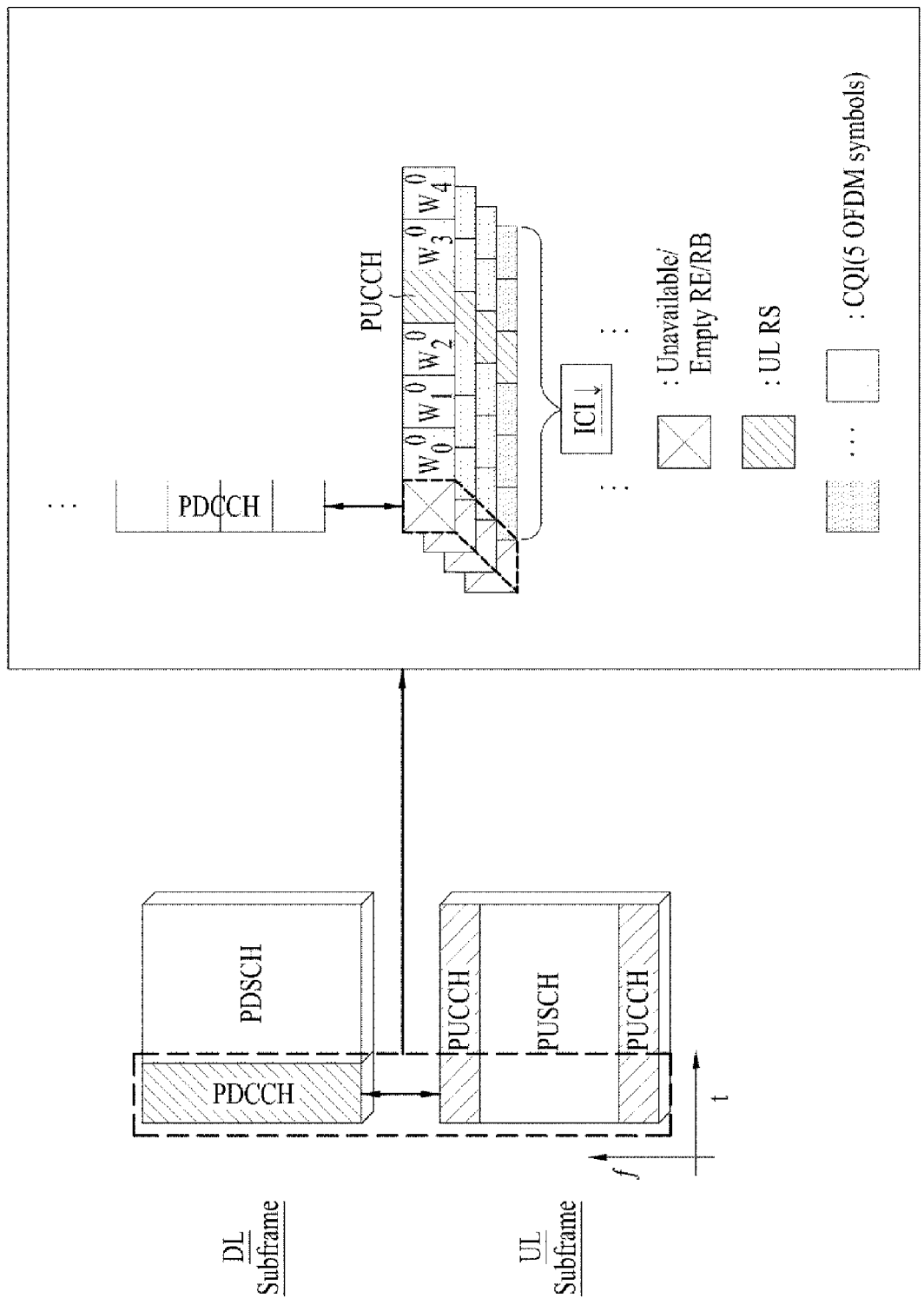
Figure 19:
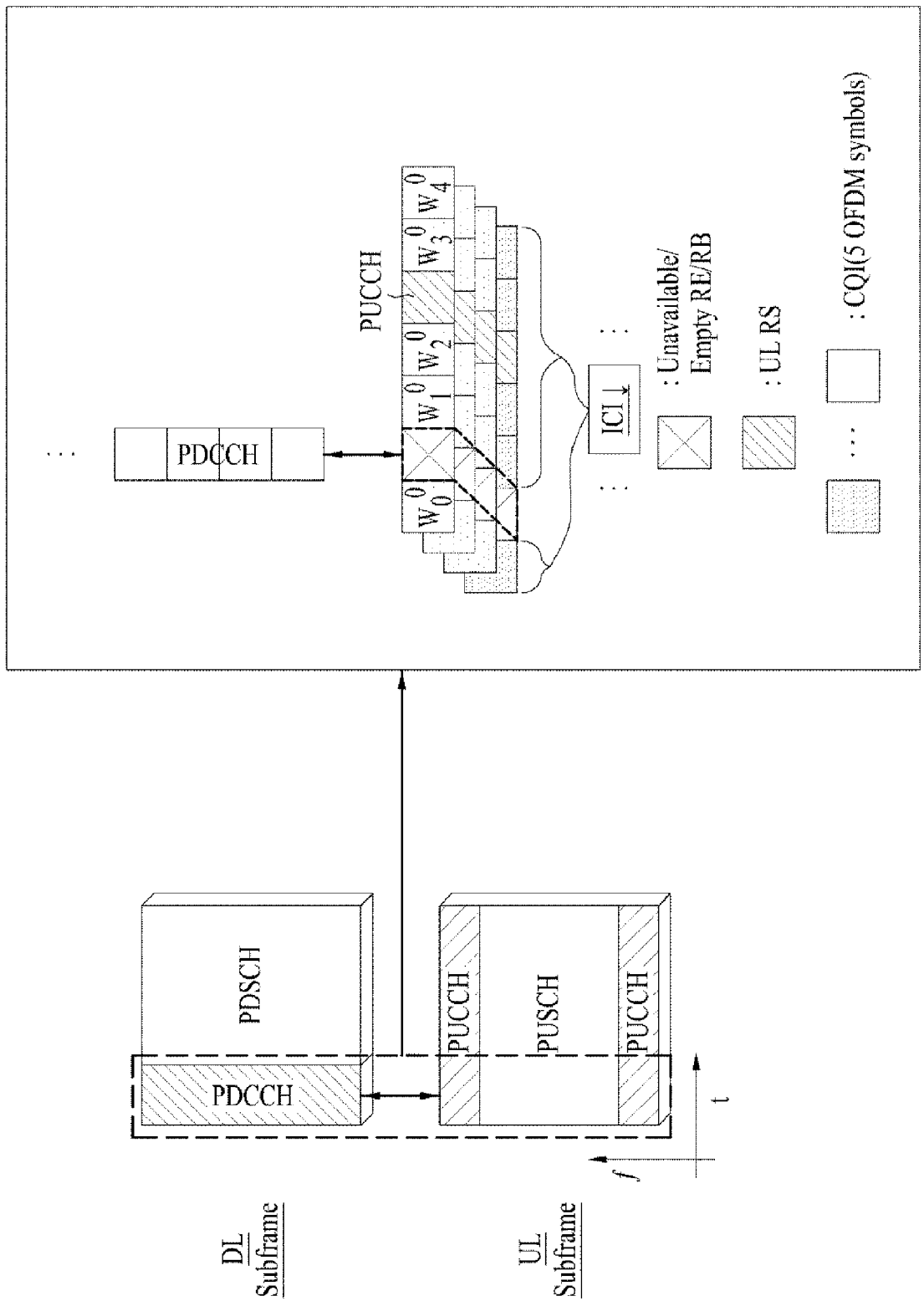

FIGS. 18 and 19 illustrate cases in which the second embodiment of the present invention is applied to PUCCH format 2/2a/2b.

Referring to FIG. 18, when the boundary of a DL subframe of a neighbor cell corresponds to the boundary of a UL subframe of the serving cell, the UE may not use the first OFDM symbol of the first slot in the UL subframe having normal CP for PUCCH transmission by using a PUCCH format for extended CP instead of a PUCCH format for normal CP in the first slot in the UL subframe having normal CP.

Referring to FIG. 19, when the boundary of the DL subframe of the neighbor cell does not correspond to the boundary of the UL subframe of the serving cell, the UE may not use one OFDM symbol occupied by a PDCCH region of the neighbor cell for PUCCH transmission by using a PUCCH format for extended CP instead of a PUCCH format for normal CP in a UL slot in which collision with the PDCCH region of the neighbor cell exists. For example, when the PDCCH region of the neighbor cell occupies the second OFDM symbol of one UL slot of the UE, the UE can perform PUCCH transmission by applying a PUCCH format for extended CP to six OFDM symbols other than the second OFDM symbol among seven OFDM symbols of the UL slot. That is, the UE can avoid or reduce ICI with the PDCCH region of the neighbor cell by adjusting the location of an OFDM symbol which is not used for the PUCCH transmission.

In the second embodiment of the present invention, the serving BS can transmit to the UE information indicating a UL subframe, UL slot or OFDM symbol in which UL transmission collides with DL transmission. The serving BS can transmit to the UE information on a PUCCH format that can be used by the UE and/or PCFICH information of a neighbor cell(s). The UE can be aware of the locations and/or number of symbols used as a PDCCH region of a neighbor cell, and a PUCCH format to be used for the UE to avoid interference with the neighbor cell.

Since UCI in PUCCH format 2/2a/2b is block-coded, and then transmitted, being distributed to a plurality of OFDM symbols, when a signal related to the block-coded UCI is damaged/lost in some OFDM symbols, the BS may not decode the block-coded UCI even when the BS successfully receives a signal from other OFDM symbols. Accordingly, the second embodiment of the present invention can obtain significant effect when a PDCCH region of a neighbor cell occupies one OFDM symbol in terms of effective transmission of PUCCH format 2/2a/2b. However, the second embodiment of the present invention can be applied to the PUCCH format 2/2a/2b even when the PDCCH region of the neighbor cell spans two or more OFDM symbols. When the PDCCH region of the neighbor cell includes two or more OFDM symbols, even if the UE transmits PUCCH 2/2a/2b according to the second embodiment of the present invention, the PDCCH of the neighbor cell and the PUCCH may collide with each other in some OFDM symbols. However, a period in which the PUCCH interferes with the PDCCH region of the neighbor cell is reduced when the second embodiment of the present invention is applied to the PUCCH format 2/2a/2b. Accordingly, interference on the neighbor cell caused by the PUCCH of the serving cell can be reduced according to the second embodiment of the present invention.

Figure 20:
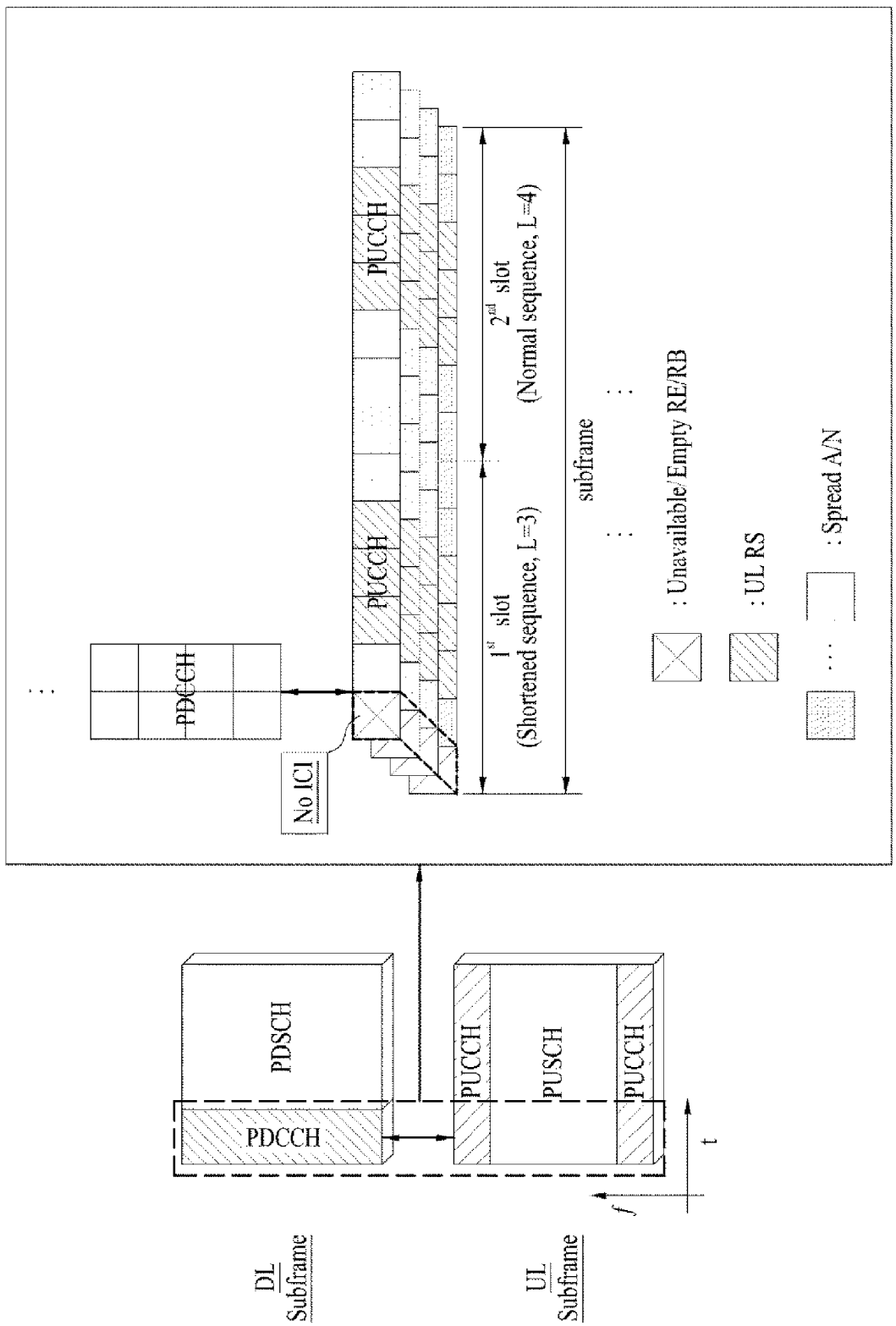

FIG. 20 illustrates a method for transmitting a UL control channel and a DL control channel at neighbor cells according to the third embodiment of the present invention.

The PUCCH format 1/1a/1b carries 1-bit or 2-bit ACK/NACK information on a PDSCH and PUCCH format 3 simultaneously carries a plurality of ACK/NACK information items, for example, a maximum of 21 ACK/NACK information items. UCI (e.g., ACK/NACK information) transmitted using PUCCH format 1/1a/1b/3 is spread in a plurality of OFDM symbols using an orthogonal sequence and then transmitted to the BS. In the case of PUCCH format 1/1a/1b/3, one or more orthogonal sequences having a predetermined length, used for spreading UCI, are defined. For PUCCH format 1/1a/1b/3, a reduced orthogonal sequence shorter than the orthogonal sequence having a predetermined length can be defined. Table 4 shows an orthogonal sequence for PUCCH format 1/1a/1b and Table 5 shows an orthogonal sequence for PUCCH format 3.

TABLE 4

| Sequence index $n_{oc}$ | Orthogonal sequence $[w_{n_{oc}}(0) \ldots w_{n_{oc}}(N^{PUCCH}_{SF} - 1)]$ | |
| --- | --- | --- |
| | $N^{PUCCH}_{SF} = 4$ | $N^{PUCCH}_{SF} = 3$ |
| 0 | [+1 +1 +1 +1] | [1 1 1] |
| 1 | [+1 −1 +1 −1] | [1 $e^{j2\pi/3}$ $e^{j4\pi/3}$] |
| 2 | [+1 −1 −1 +1] | [1 $e^{j4\pi/3}$ $e^{j3\pi/3}$] |

TABLE 5

| Sequence index $n_{oc}$ | Orthogonal sequence $[w_{n_{oc}}(0) \ldots w_{n_{oc}}(N^{PUCCH}_{SF} - 1)]$ | |
| --- | --- | --- |
| | $N^{PUCCH}_{SF} = 5$ | $N^{PUCCH}_{SF} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

Referring to Table 4, when the UE applies an orthogonal sequence having a length of 4, that is, L=4, to UCI for transmission of the UCI using PUCCH format 1/1a/1b, the UCI is spread in four OFDM symbols. When an orthogonal sequence with L=3 instead of the orthogonal sequence with L=4 is applied to the UCI, the UCI is spread in three OFDM symbols. Referring to Table 5, when the UE applies an orthogonal sequence with L=5 to UCI for transmission of the UCI using PUCCH format 3, the UCI is spread in five OFDM symbols. When an orthogonal sequence with L=4 instead of the orthogonal sequence with L=5 is applied to the UCI, the UCI is spread in four OFDM symbols. That is, when the UCI is spread using a reduced orthogonal sequence, the UCI is spread in OFDM symbols shorter by one OFDM symbol than the OFDM symbols in which the UCI is spread using the original orthogonal sequence. By using this characteristic of the reduced orthogonal sequence, the third embodiment of the present invention mitigates ICI by reducing the number of OFDM symbols required for transmission of PUCCH format 1/1a/1b/3 using the reduced orthogonal sequence.

Referring to FIG. 20, when the boundary of a DL subframe of a neighbor cell corresponds to the boundary of a UL frame of a serving cell, the UE may not use the first OFDM symbol of the first slot in the UL subframe having normal CP for PUCCH transmission by spreading UCI using a reduced orthogonal sequence (L=3) instead of an orthogonal sequence (L=4) having a normal length in the first slot in the UL subframe. For the second slot, the UE can spread the UCI in four OFDM symbols in the second slot using the orthogonal sequence (L=4) having the normal length. Otherwise, the orthogonal sequence having a shorter length can be also applied to the second slot.

When the boundary of the DL subframe of the neighbor cell does not correspond to the boundary of the UL frame of the serving cell, the UE may not use one OFDM symbol occupied by a PDCCH region of the neighbor cell for PUCCH transmission by using a reduced orthogonal sequence instead of a normal orthogonal sequence in a UL slot in which collision with the PDCCH region of the neighbor cell exists. For example, when the PDCCH region of the neighbor cell occupies the second OFDM symbol of one UL slot of the UE, the UE can spread UCI in three OFDM symbols other than the second OFDM symbol occupied by the PDCCH region and three OFDM symbols for UL RSs among seven OFDM symbols of the UL slot by using an orthogonal sequence with L=3 instead of an orthogonal sequence with L=4.

In the third embodiment of the present invention, the serving BS can transmit to the UE information indicating a UL subframe, UL slot or OFDM symbol in which UL transmission and DL transmission collide with each other. The serving BS can transmit the UE information on a PUCCH format that can be used by the UE, spread sequence information and/or PCFICH information of neighbor cell(s). The UE can recognize the locations and/or number of symbols used as a PDCCH region of the neighbor cell, a PUCCH format and/or an orthogonal sequence to be used for the UE to avoid interference with the neighbor cell on the basis of the information.

The third embodiment of the present invention can be applied irrespective of the number of OFDM symbols occupied by the PDCCH region of the neighbor cell. According to the third embodiment of the present invention, ICI between a PDCCH and a PUCCH can be removed in at least one OFDM symbol.

Figure 21:
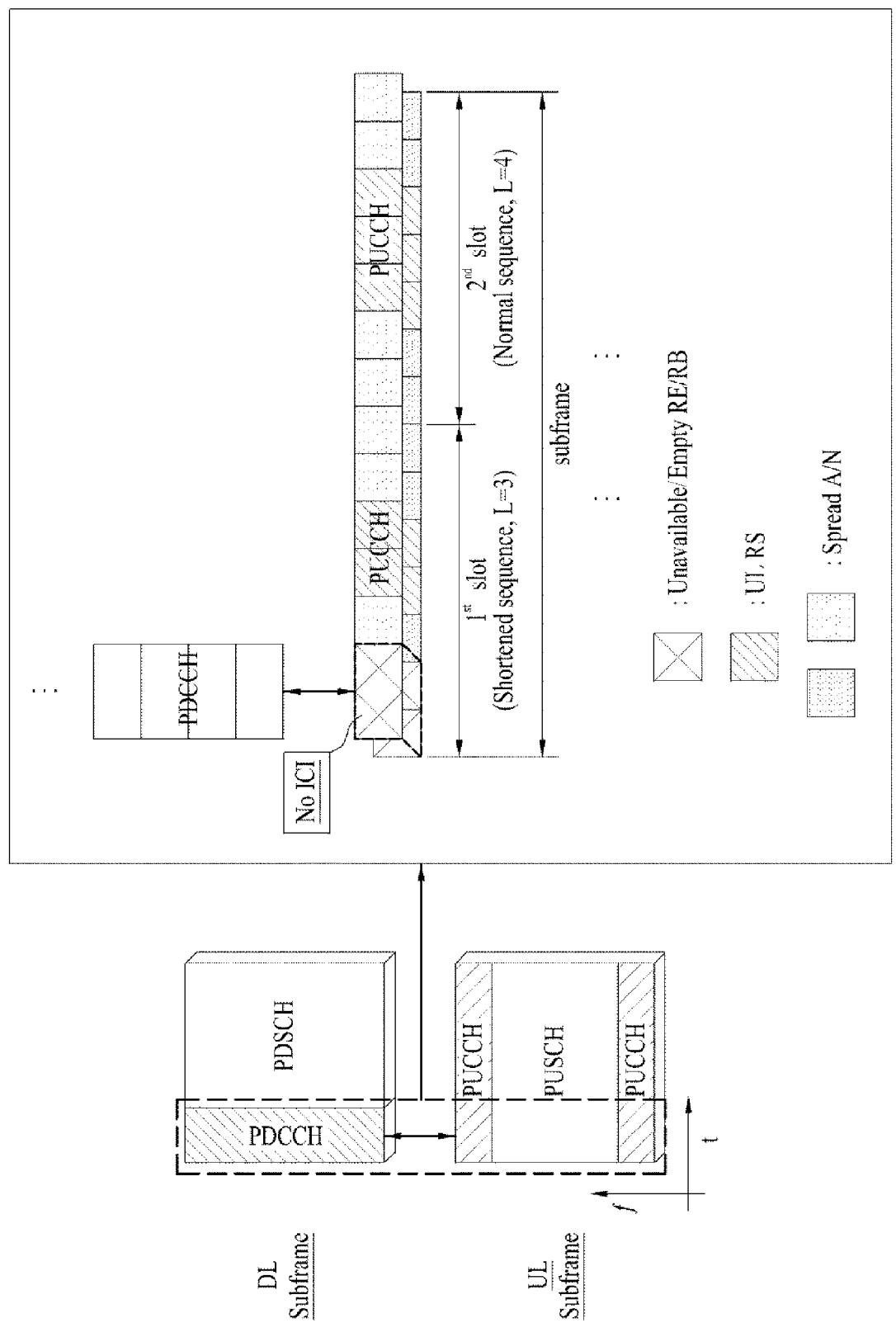

FIG. 21 illustrates a method for mapping a UL control channel to a DL control channel at neighbor cells according to the second and third embodiments of the present invention.

Collision between a PDCCH and a PUCCH can be avoided in maximum two OFDM symbols by using the second and third embodiments of the present invention together. For example, the UE can spread UCI using an orthogonal sequence with L=3 and transmit the spread UCI using PUCCH format 1/1a/1b for extended CP. In this case, a PUCCH carrying the UCI includes two OFDM symbols in which UL RSs are transmitted and three OFDM symbols in which the spread UCI are transmitted. Accordingly, two of seven OFDM symbols of a UL slot having normal CP may not be used for PUCCH transmission according to a combination of the second and third embodiments of the present invention. In this case, the PUCCH and a PUCCH of the neighbor cell do not collide with each other in the two OFDM symbols. The second and third embodiments of the present invention can be applied to not only a case in which boundaries of subframes of neighboring cells correspond to each other but also a case in which they do not correspond to each other by adjusting locations of OFDM symbols which are not used for PDCCH transmission.

Figure 22:
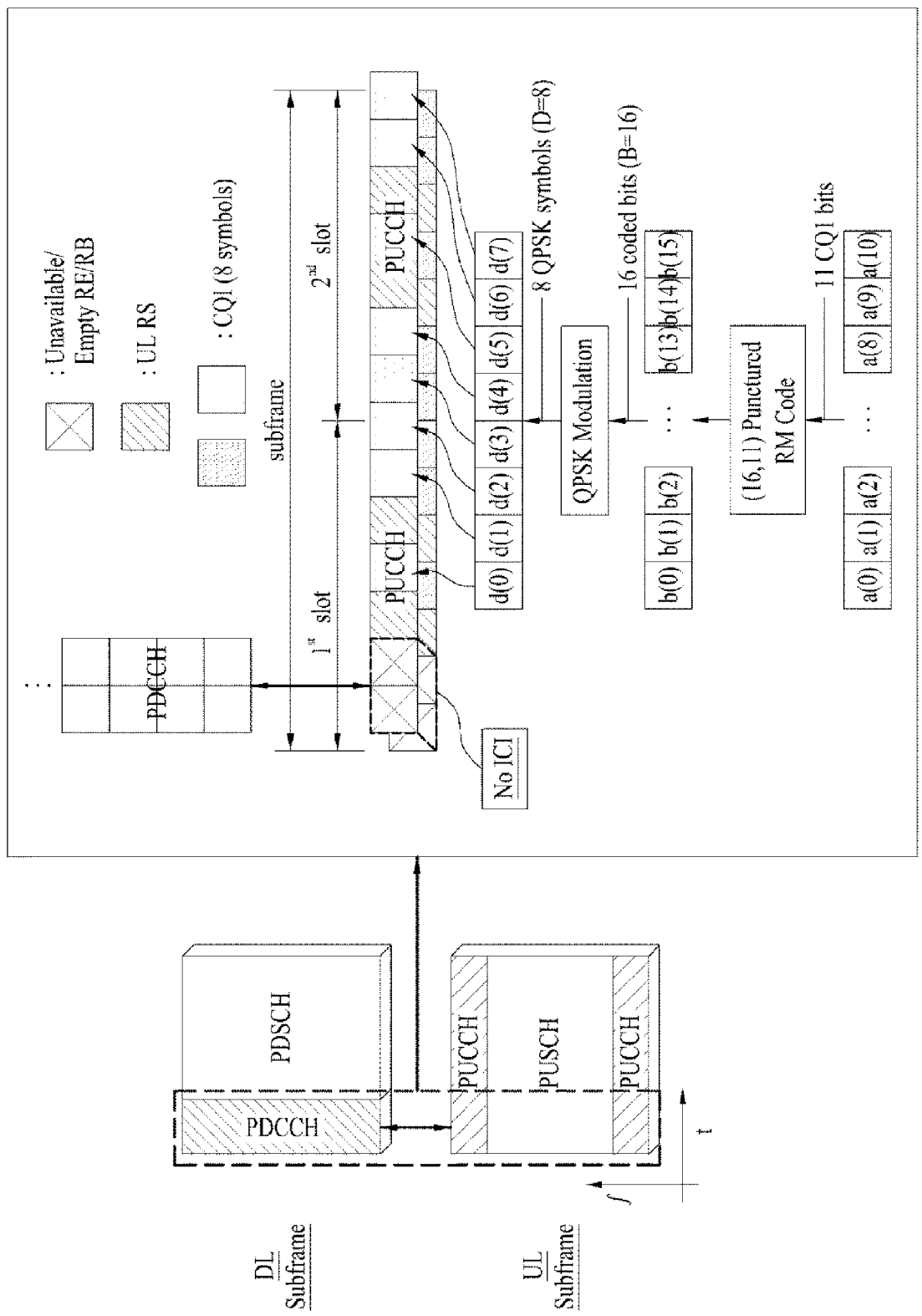

FIG. 22 illustrates a method for transmitting a UL control channel and a DL control channel at neighbor cells according to the fourth embodiment of the present invention.

A PUCCH of format 2/2a/2b carries channel status information, for example, CQI, or carries CQI and ACK/NACK information simultaneously. Referring to FIGS. 11 and 12, CQI transmitted through PUCCH format 2/2a/2b is block-coded, and then segmented and mapped to a plurality of OFDM symbols. For example, when input CQI is $a_0$, $a_1$, $a_2$, $a_3$, $a_{A-1}$ (a denotes the bit number of the CQI), the CQI can be block-coded by punctured Reed Muller code (20, A) having a coding rate of ½, and then segmented and mapped to 10 OFDM symbols. Reed Muller code (B, A) is used to code A-bit input information into B-bit output information. Table 6 shows basis sequences of Reed Muller code (20, A).

TABLE 6

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 0 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Referring to FIG. 6, codewords of Reed Muller code (20, A) are linear combinations of 13 basis sequences represented by $M_{i,n}$. The A-bit CQI can be coded into B bits (here, B=20) according to Table 6 and the following Math Figure.

Math Figure 1

$$b_i = \sum_{n=0}^{A-1} (a_n \cdot M_{i,n}) \bmod 2 \text{ where } i = 0, 1, 2, \ldots, B-1 \quad \text{[Math. 1]}$$

When the A-bit CQI is coded using Table 6 and Math Figure 1, 10-bit information is output. Referring to FIG. 3, the modulation mapper 302 QPSK-modulates the 10-bit information by two bits to output 10 QPSK symbols. The 10 QPSK symbols are respectively mapped to 10 OFDM symbols other than symbols for UL RSs among OFDM symbols of a UL subframe.

The fourth embodiment of the present invention does not use OFDM symbols including a PDCCH of a neighbor cell for PUCCH transmission by adjusting a coding rate of an information bit. That is, the fourth embodiment of the present invention can adjust the number of OFDM symbols for PUCCH transmission by controlling B that determines the range of i in Math FIG. 1.

For instance, when a PDCCH region of a neighbor cell spans $L_{PUCCH}$ OFDM symbols, the UE can code the CQI by setting B to (20-2*$L_{PUCCH}$). If QPSK is applied to PUCCH transmission, the B-bit coded CQI is modulated into D=B/2 complex modulation symbols, that is, D QPSK symbols.

Referring to FIG. 22, if a PDCCH region of a neighbor cell spans two OFDM symbols and CQI has 11 bits, the UE can apply a RM code (16, 11) to the 11-bit CQI to output coded 16 bits. The UE applies QPSK modulation to the coded 16 bits to generate 8 QPSK symbols. The UE can one-to-one map the 8 QPSK symbols to 8 symbols other than OFDM symbol(s) colliding with the PDCCH region of the neighbor cell and OFDM symbols used for the UE to transmit UL RSs among OFDM symbols of a UL subframe allocated with a PUCCH and transmit the mapped symbols to the BS of the serving cell. Therefore, according to the fourth embodiment of the present invention, the number of output bits, B, is reduced in a UL subframe having interference as compared to a UL subframe having no interference, and thus coding rate A/B increases.

In the fourth embodiment of the present invention, the serving BS can transmit to the UE information indicating a UL subframe, UL slot or OFDM symbol in which UL transmission and DL transmission collide with each other. The serving BS can transmit to the UE information on a PUCCH format that can be used by the UE, spread sequence information and/or PCFICH information of neighbor cell(s). The UE can recognize the locations and/or number of symbols used as a PDCCH region of a neighbor cell and a PUCCH format to be used for the UE to avoid interference with the neighbor cell on the basis of the information.

The above-described first and second schemes of the present invention mitigate ICI using configuration and/or location of the existing UL/DL control channel format. Accordingly, the existing UEs can transmit/receive new control channels, and thus they can be implemented in the asymmetric TDD system while minimizing the influence on the existing communication systems. Further, the first and second schemes of the present invention can be implemented while minimizing the influence on the existing systems by using the overall structure of the existing frame. Therefore, the embodiments of the present invention can be easily implemented by simply controlling processing.

[Scheme of Acquiring PDCCH Information of Neighbor Cell]

In the above-described embodiments of the present invention, the BS can transmit to the UE information indicating OFDM symbols used for transmission of a DL control channel or information indicating a UL subframe or UL slot including the OFDM symbols. The UE determines whether there is DL transmission which will collide with UL transmission in a UL subframe through which the UL transmission is performed by the UE on the basis of the information transmitted from the BS and configures a channel for the UL transmission in such a manner that OFDM symbols used for the DL transmission are not used for the UL transmission if possible when the DL transmission which will collide with the UL transmission is present according to an embodiment of the present invention. That is, the UE had better know a region to which DL transmission of a neighbor cell is allocated in order to perform UL transmission according to an embodiment of the present invention.

A description will be given of embodiments of the present invention for providing information about a PDCCH region to the UE. The following embodiments can be used in combination with one of the aforementioned first and second schemes.

In the 3GPP LTE(-A) system, a PDCCH region for PDCCH transmission dynamically spans from one OFDM symbol to three OFDM symbols. If the UE knows the number of OFDM symbols occupied by the PDCCH region in a DL subframe of a neighbor cell, the UE can change or adjust configuration of a PUCCH and/or a PUSCH which interferes with the PDCCH of the neighbor cell.

The BS of the serving cell can transmit PDCCH region information of the neighbor cell to the UE according to one of the following embodiments of the present invention. The UE can acquire/estimate information on the PDCCH region of the neighbor cell, which interferes with uplink transmission by the UE or is interfered by the uplink transmission using the PDCCH region information received from the BS of the serving cell.

Embodiment A

Use of Cross-Carrier Scheduling Configuration Information

Cross-carrier scheduling means scheduling for a specific carrier, performed by a carrier other than the specific carrier, in carrier aggregation in which a BS can communicate with a UE using a plurality of carriers. For example, when the BS communicates with the UE using two carriers simultaneously, the BS can transmit to the UE allocation information about a PDSCH, which will be transmitted by the second carrier, using the first carrier. In this case, it can be considered that resources of the second carrier are cross-scheduled by the first carrier. Carrier aggregation means a technology of aggregating a plurality of uplink/downlink frequency blocks to generate a wider uplink/downlink band and using the uplink/downlink band for communication. A center frequency of each frequency block or a corresponding block used for carrier aggregation is called a component carrier (CC).

A CC without PDCCH can be configured when cross-carrier scheduling is applied. Only PDSCH transmission, that is, data transmission is performed on the CC without PDCCH. On the CC, PCFICH carrying control formation information (CFI) that is information on the number of OFDM symbols occupied by a PDCCH region can be transmitted. However, since cross-carrier scheduling is usually performed to transmit control information at a CC having a channel state, there is a high possibility that a cross-scheduled CC has a channel state poorer than that of a cross-scheduling CC. In this case, a detection error may be generated according to channel states of the CCs even when the UE detects a PCFICH from each CC. Accordingly, the BS transmits to the UE CFI of the cross-scheduled CC on the cross-scheduling CC through RRC scheduling.

In the embodiment A of the present invention, the BS provides information about a PDCCH region of an interfering cell to the UE by transmitting to the UE not only CFI of CCs used by the serving cell but also CFI of neighbor cell(s) having ICI with the serving cell through RRC signaling. The UE can acquire locations of OFDM symbols used as a PDCCH region of a neighbor cell or CC from the CFI received from the BS through RRC signaling.

Embodiment B

Use of Cell-Specific PDCCH Configuration Information

It is possible to previously set a PDCCH region to be commonly used by a predetermined number of neighbor cells. In the embodiment B of the present invention, the BS can transmit information about the previously set PDDCH region to the UE to provide PDCCH region information of the neighbor cells to the UE. The UE can be aware of locations of OFDM symbols used as the PDCCH region of the neighbor cells using the PDCCH region information.

Embodiment C

Use of PHICH Duration Information

Figure 23:
FIG. 23 illustrates an example of mapping PHICH orthogonal codes to OFDM symbols according to PHICH duration.

FIG. 23 illustrates an example of mapping a physical hybrid ARQ indicator channel (PHICH) orthogonal code to an OFDM symbol according to PHICH duration.

PHICH duration means a physical OFDM region to which a PHICH resource is allocated. A PHICH needs to be allocated in a PDCCH region, and thus the PHICH duration cannot exceed the PDCCH region. The PHICH duration is cell-specifically determined, and the BS informs UEs in the coverage thereof the PHICH duration using a master information block (MIB) transmitted through a physical broadcast channel (PBCH). A UE receives the PBCH and recognizes the PHICH duration of the cell to which the UE belongs through the MIB carried by the PBCH.

In the embodiment C of the present invention, information on MIBs or PHICH durations of neighbor cells is signaled by the BS to the UE. Otherwise, the UE directly detects a PBCH transmitted by a neighbor cell to acquire information about MIB or PHICH duration.

The UE can estimate a PDCCH region of the neighbor cell using the PHICH duration information acquired as above. For example, the UE can estimate the PDCCH region according to the following Math Figure.

MathFigure 2

$$\text{PDCCH region} = d_{PHICH} + \alpha_{offset} \text{ where } \alpha_{offset} \in \{1,2,3,4\} \quad \text{[Math.2]}$$

In Math FIG. 2, PDCCH region indicates the number of OFDM symbols used as the PDCCH region, and $d_{PHICH}$ denotes the PHICH duration. Referring to Math FIG. 2, the UE can consider the PHICH duration as the PDCCH region, or consider the PHICH duration given a predetermined gap $\alpha_{offset}$ as the PDCCH region.

The BS according to the present invention can transmit information about the PDCCH region to the UE according to one of the embodiment A and embodiment B of the present invention. The BS can recognize location(s) of OFDM symbol(s) colliding with a PDCCH of a neighbor cell in a UL subframe on the basis of the PDCCH region information transmitted according to one of the embodiment A and embodiment B. The UE can transmit a PUCCH and/or a PDSCH in the UL subframe according to one of the embodiments described in the first and second schemes of the present invention.

Referring to FIG. 2, the BS processor 400b according to the present invention can transmit to the UE information indicating a subframe, slot or OFDM symbol allocated with a DL control channel which interferes with UL transmission by the UE or is interfered by the UL transmission. The UE receiver 300a receives the information and the UE processor 400a determines a DL control channel region that may cause ICI with the UL transmission by the UE on the basis of the information. Otherwise, the UE processor 400a may control the UE receiver 300a to detect control region configuration information transmitted by neighbor cell(s) of the serving cell to which the UE belongs, for example, CFI(s), and determine the DL control channel region that may cause ICI with the UL transmission by the UE on the basis of the CFI(s).

When a UL subframe allocated with UL transmission includes an OFDM symbol (referred to as an interfering OFDM symbol hereinafter) used as the DL control channel region, the UE processor 400a according to the first scheme of the present invention can transmit UCI in the UL subframe using a specific PUCCH format from among various PUCCH formats used for UCI transmission, for example, PUCCH format 1/1a/1b or PUCCH format 3. The specific PUCCH format may be determined by the BS processor 400b and informed to the UE by the BS transmitter 100b. Otherwise, the specific PUCCH format may be previously determined to be used when UL transmission and DL transmission collide with each other such that the BS and UE can be aware of the specific PUCCH format in advance. The UE processor 400a according to the first scheme of the present invention can configure a PUCCH in a specific PUCCH format, for example, format 1/1a/1b or format 3, in a UL subframe including an interfering OFDM symbol and control the UE transmitter 100a to transmit UCI on the PUCCH. The UE processor 400a can spread the UCI in a plurality of OFDM symbols in a UL subframe or a UL slot according to the PUCCH format 1/1a/1b or PUCCH format 3, and control the UE transmitter 100a to transmit the spread UCI over the corresponding PUCCH in the UL subframe/UL slot.

When a UL subframe allocated with UL transmission includes an OFDM symbol (interfering OFDM symbol) used as the DL control channel region, the UE processor 400a according to the second scheme of the present invention can perform UL transmission in the remaining OFDM symbols without using the interfering OFDM symbol. When the UL subframe includes a plurality of interfering OFDM symbols, the UE processor 400a may not use one or more interfering OFDM symbols for UCI transmission according to the second scheme of the present invention. To achieve this, the UE processor 400a can configure a PUCCH/PDSCH using OFDM symbols other than interfering OFDM symbol(s) among a plurality of OFDM symbols in a UL slot/subframe. For instance, the UE processor 400a according to the second embodiment of the present invention may not use an interfering OFDM symbol for UCI transmission by configuring a PUCCH for extended CP using OFDM symbols other than the interfering OFDM symbol rather than configuring a PUCCH for normal CP which occupies a plurality of OFDM symbols including the interfering OFDM symbol, in a UL subframe including the interfering OFDM symbol. Alternatively, the UE processor 400a according to the third embodiment of the present invention may not use an interfering OFDM symbol for UCI transmission by spreading UCI to OFDM symbols other than the interfering OFDM symbol using a reduced orthogonal sequence shorter than a normal orthogonal sequence in a UL subframe including the interfering OFDM symbol rather than spreading the UCI to OFDM symbols including the interfering OFDM symbol using the normal orthogonal sequence. Alternatively, the UE processor 400a according to the fourth embodiment of the present invention can code UCI with a coding rate higher than a normal coding rate used for a UL subframe having no interference in a UL subframe having an interfering OFDM symbol rather than coding the UCI with the normal coding rate and then distributing the coded UCI to OFDM symbols including the interfering OFDM symbol so as to reduce the number of bits of the coded UCI. In addition, the UE processor 400a according to the fourth embodiment of the present invention may not use the interfering OFDM symbol for transmission of the UCI by distributing the coded UCI with the reduced bit number to OFDM symbols other than the interfering OFDM symbol.

The UE processor 400a controls the UE transmitter 100a to transmit UCI in the UL subframe over a PUCCH configured according to the first scheme or the second scheme of the present invention.

The BS receiver 300b can detect the PUCCH transmitted from the UE and receive the UCI transmitted from the UE on the PUCCH in the UL subframe under the control of the BS processor 400b. Since the PUCCH is allocated by the BS processor 400b to the UE, the BS processor 400a can recognize that the UL subframe transmits the PUCCH. When the BS transmits to the UE information indicating that the UL subframe includes an interfering OFDM symbol, the BS processor 400b can recognize which OFDM symbols in the UL subframe are used or not for the UE to configure the PUCCH. Even when the UE detects control region information of a neighbor cell to recognize an interfering OFDM symbol, the BS processor 400b can be aware of the control region information by communicating with a neighbor BS or detecting the control region information, and thus the BS processor 400b can recognize which OFDM symbols in the UL subframe are used or not for the UE to configure the PUCCH. Therefore, the BS processor 400b can control the BS receiver 300b to receive a time-frequency resource allocated with the PUCCH among time-frequency resources in the subframe. That is, the BS receiver 300b can receive UCI transmitted by the UE over the PUCCH configured by the UE in the subframe under the control of the BS processor 400b.

When UL transmission by the UE and DL transmission by a neighbor cell collide with each other in the asymmetric TDD system, the UE according to the present invention configures a channel for the UL transmission in a specific format from among a plurality of channel formats, or configures a channel for the UL transmission using only symbols other than a symbol used for the DL transmission. Therefore, according to the embodiments of the present invention, time-frequency resources for UL transmission colliding with DL transmission by a neighbor cell can be reduced or removed to mitigate ICI. This can solve/alleviate performance deterioration to which a DL signal transmitted by a specific BS is subjected due to interference caused by a UL signal of a UE communicating with a neighbor BS in an asymmetric TDD system. Furthermore, performance deterioration to which UL signal transmitted to the specific BS is subjected due to interference caused by a DL signal transmitted by the neighbor BS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

The invention claimed is:

1. A method for transmitting uplink control information at a user equipment (UE) to a base station (BS) in a time resource unit including a plurality of orthogonal frequency division multiplexing (OFDM) symbols in a time division duplex (TDD) system, the method comprising:
   configuring an uplink control channel in the time resource unit; and
   transmitting the uplink control information in the time resource unit to the BS through the uplink control channel,
   wherein when the time resource unit includes an interfering OFDM symbol in which interference caused by a downlink control channel occurs, the uplink control channel is configured in a specific format from among a plurality of uplink control channel formats.

2. The method according to claim 1, wherein the uplink control channel of the specific format carries the uplink control information spread in two or more OFDM symbols in the uplink control channel.

3. A method for receiving uplink control information at a base station (BS) from a user equipment (UE) in a time resource unit including a plurality of orthogonal frequency division multiplexing (OFDM) symbols in a time division duplex (TDD) system, the method comprising:
   receiving the uplink control information from the UE through an uplink control channel allocated to the time resource unit,
   wherein when the time resource unit includes an interfering OFDM symbol in which interference caused by a downlink control channel occurs, the uplink control channel is configured in a specific format from among a plurality of uplink control channel formats.

4. The method according to claim 3, wherein the uplink control channel of the specific format carries the uplink control information spread in two or more OFDM symbols in the uplink control channel.

5. A user equipment (UE) for transmitting uplink control information to a base station (BS) in a time resource unit including a plurality of orthogonal frequency division multiplexing (OFDM) symbols in a time division duplex (TDD) system, the UE comprising:
   a radio frequency (RF) unit configured to transmit/receive signals; and
   a processor connected to the RF unit and configured to control the RF unit,
   wherein the processor configures an uplink control channel in the time resource unit and controls the RF unit to transmit the uplink control information to the BS in the time resource unit through the uplink control channel,
   wherein when the time resource unit includes an interfering OFDM symbol in which interference caused by a downlink control channel occurs, the processor configures the uplink control channel in a specific format from among a plurality of uplink control channel formats.

6. The UE according to claim 5, wherein the uplink control channel of the specific format carries the uplink control information spread in two or more OFDM symbols in the uplink control channel.

7. A base station (BS) for receiving uplink control information from a UE in a time resource unit including a plurality of orthogonal frequency division multiplexing (OFDM) symbols in a time division duplex (TDD) system, the BS comprising:
   a radio frequency (RF) unit configured to transmit/receive signals; and a processor connected to the RF unit and configured to control the RF unit, wherein the processor controls the RF unit to receive the uplink control information from the UE through an uplink control channel allocated to the time resource unit, wherein when the time resource unit includes an interfering OFDM symbol in which interference caused by a downlink control channel occurs, the uplink control channel is configured in a specific format from among a plurality of uplink control channel formats.

8. The BS according to claim 7, wherein the uplink control channel of the specific format carries the uplink control information spread in two or more OFDM symbols in the uplink control channel.

* * * * *